(12) United States Patent
Ahn et al.

(10) Patent No.: US 7,583,337 B2
(45) Date of Patent: Sep. 1, 2009

(54) LIQUID CRYSTAL DISPLAY DEVICE AND METHOD OF FABRICATING SAME

(75) Inventors: Byung Chul Ahn, Anyang-si (KR); Tae Yong Jung, Gumi-si (KR); Ji No Lee, Goyang-si (KR); Hee Young Kwack, Seoul (KR)

(73) Assignee: LG Display Co., Ltd., Seoul (KR)

( * ) Notice: Subject to any disclaimer, the term of this patent is extended or adjusted under 35 U.S.C. 154(b) by 435 days.

(21) Appl. No.: 11/142,315

(22) Filed: Jun. 2, 2005

(65) Prior Publication Data
US 2005/0270452 A1 Dec. 8, 2005

(30) Foreign Application Priority Data
Jun. 5, 2004 (KR) .................. 10-2004-0041141

(51) Int. Cl.
*G02F 1/1335* (2006.01)

(52) U.S. Cl. ..................................... 349/114

(58) Field of Classification Search .............. 349/54, 349/58, 149–152, 187, 192
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 6,556,265 B1 * | 4/2003 | Murade | 349/111 |
| 6,559,920 B1 * | 5/2003 | Ahn et al. | 349/187 |
| 6,624,446 B2 * | 9/2003 | Kim | 257/72 |

(Continued)

FOREIGN PATENT DOCUMENTS

JP 6-235939 8/1994

(Continued)

OTHER PUBLICATIONS

Office Action issued by the Japanese Patent Office on Jul. 5, 2006, (w/ English Translation).

*Primary Examiner*—Timothy Rude
(74) *Attorney, Agent, or Firm*—McKenna Long & Aldridge

(57) ABSTRACT

A liquid crystal display device is provided that comprises a gate line; a first insulating film on the gate line; a data line crossing the gate line to define a pixel region, the pixel region having a transmissive area and a reflective area; a thin film transistor connected to the gate line and the data line; a pixel electrode formed in the pixel region; a second insulating film on the thin film transistor; a storage capacitor including a storage upper electrode overlapping the gate line; a transmission hole exposing at least a portion of the pixel electrode, and a reflective electrode formed in the reflective area of the pixel region, the reflective electrode connecting the pixel electrode with thin film transistor and the storage upper electrode, wherein the gate line and the pixel electrode include a first transparent conductive layer.

43 Claims, 44 Drawing Sheets

U.S. PATENT DOCUMENTS

| | | | |
|---|---|---|---|
| 6,683,666 B1* | 1/2004 | Jang et al. | 349/113 |
| 6,897,925 B2* | 5/2005 | Kim et al. | 349/114 |
| 6,914,643 B1* | 7/2005 | Nagase et al. | 349/40 |
| 7,453,537 B2* | 11/2008 | Kim et al. | 349/114 |
| 7,480,020 B2* | 1/2009 | Wen et al. | 349/114 |
| 7,528,909 B2* | 5/2009 | Ahn et al. | 349/114 |
| 2002/0101547 A1* | 8/2002 | Lee et al. | 349/40 |
| 2003/0133059 A1 | 7/2003 | Wei et al. | |
| 2004/0021813 A1* | 2/2004 | Kim et al. | 349/113 |
| 2004/0075793 A1* | 4/2004 | Itoh et al. | 349/114 |
| 2004/0125313 A1* | 7/2004 | Lim | 349/152 |

FOREIGN PATENT DOCUMENTS

| | | |
|---|---|---|
| JP | 2002-182239 | 6/2002 |
| JP | 2003-255378 | 9/2003 |
| JP | 2004-046223 | 2/2004 |
| JP | 2004-070355 | 3/2004 |
| JP | 2004-101792 | 4/2004 |
| JP | 2005-352479 | 12/2005 |
| WO | WO 03/107434 | 12/2003 |

* cited by examiner

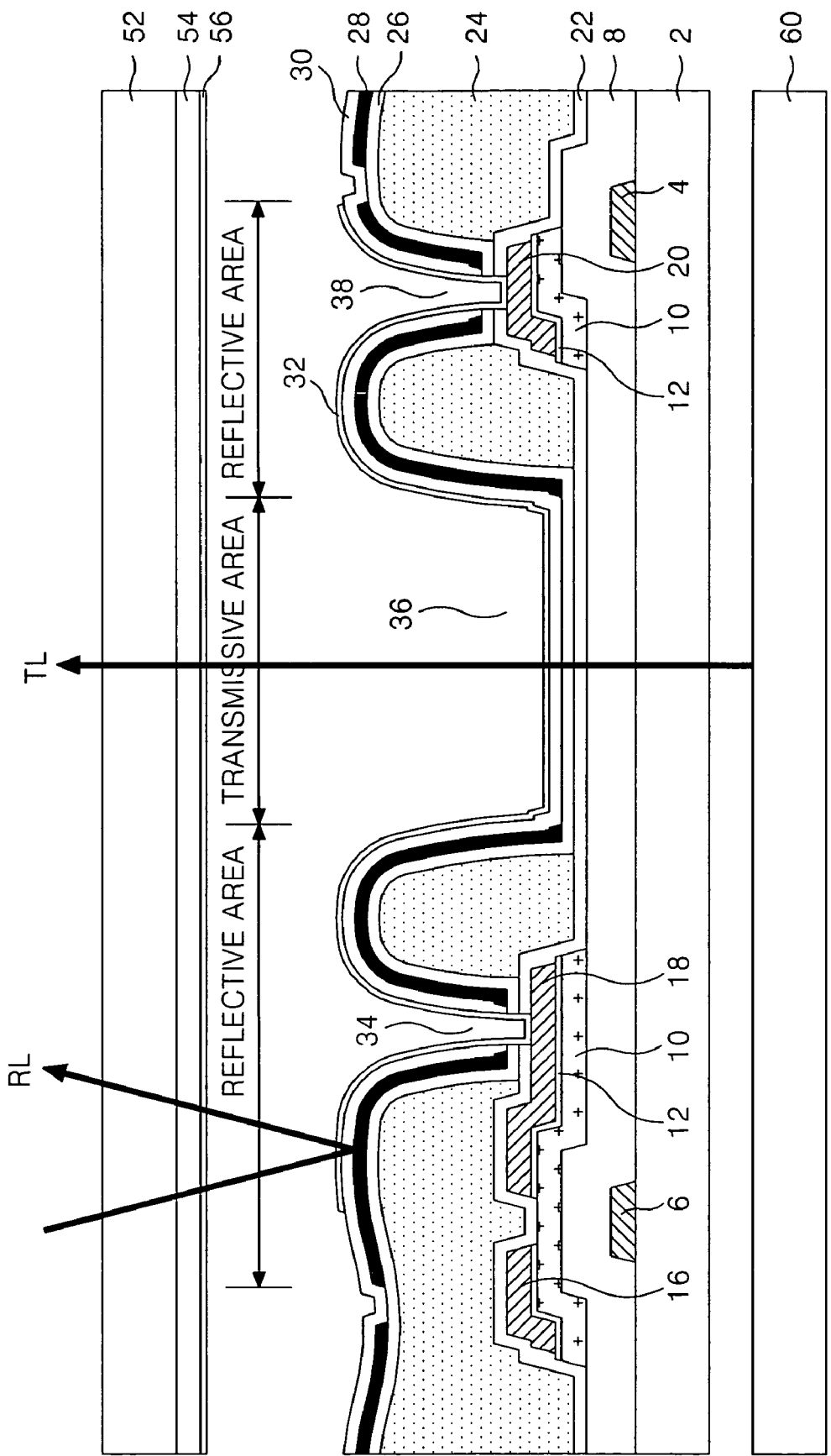

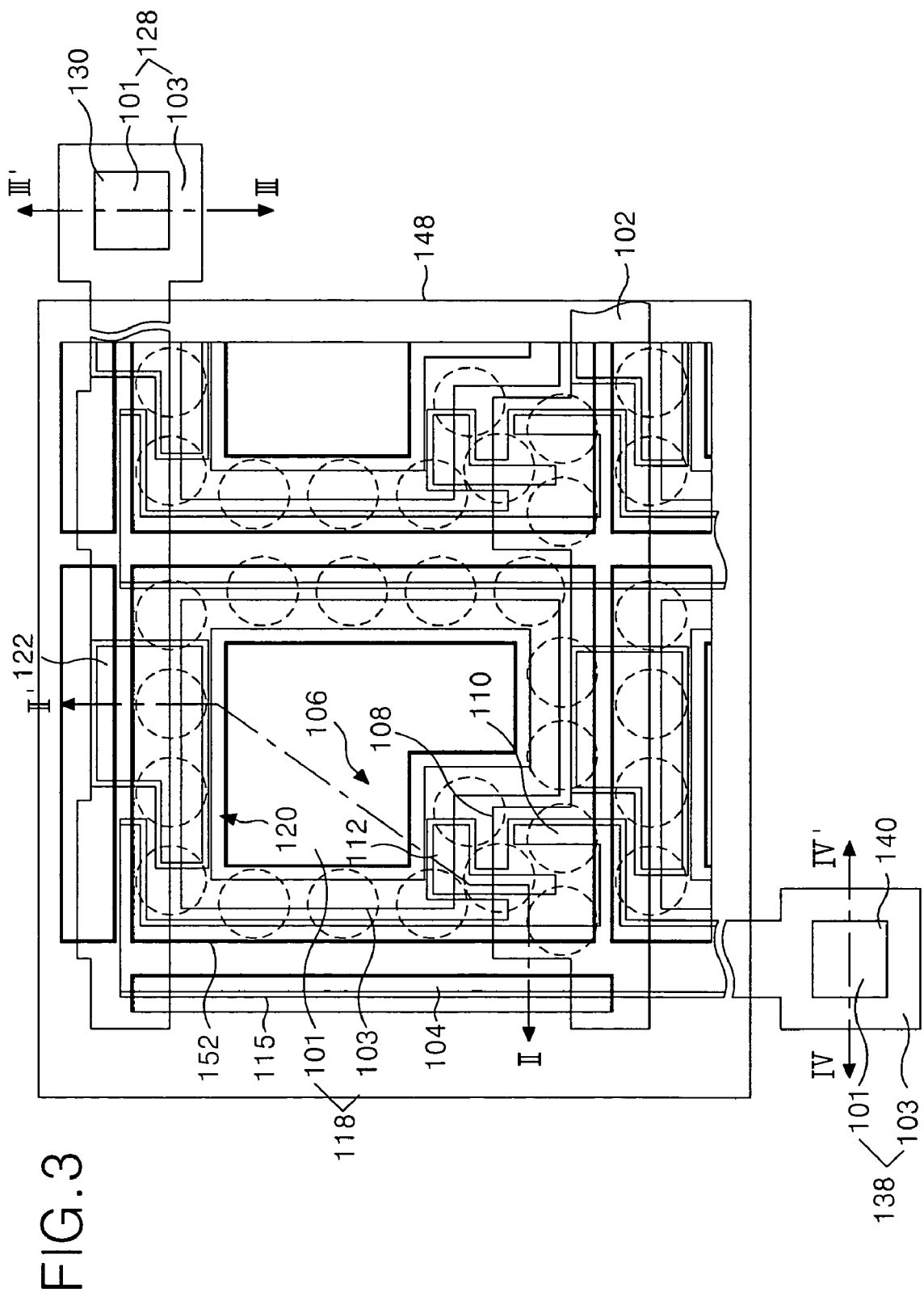

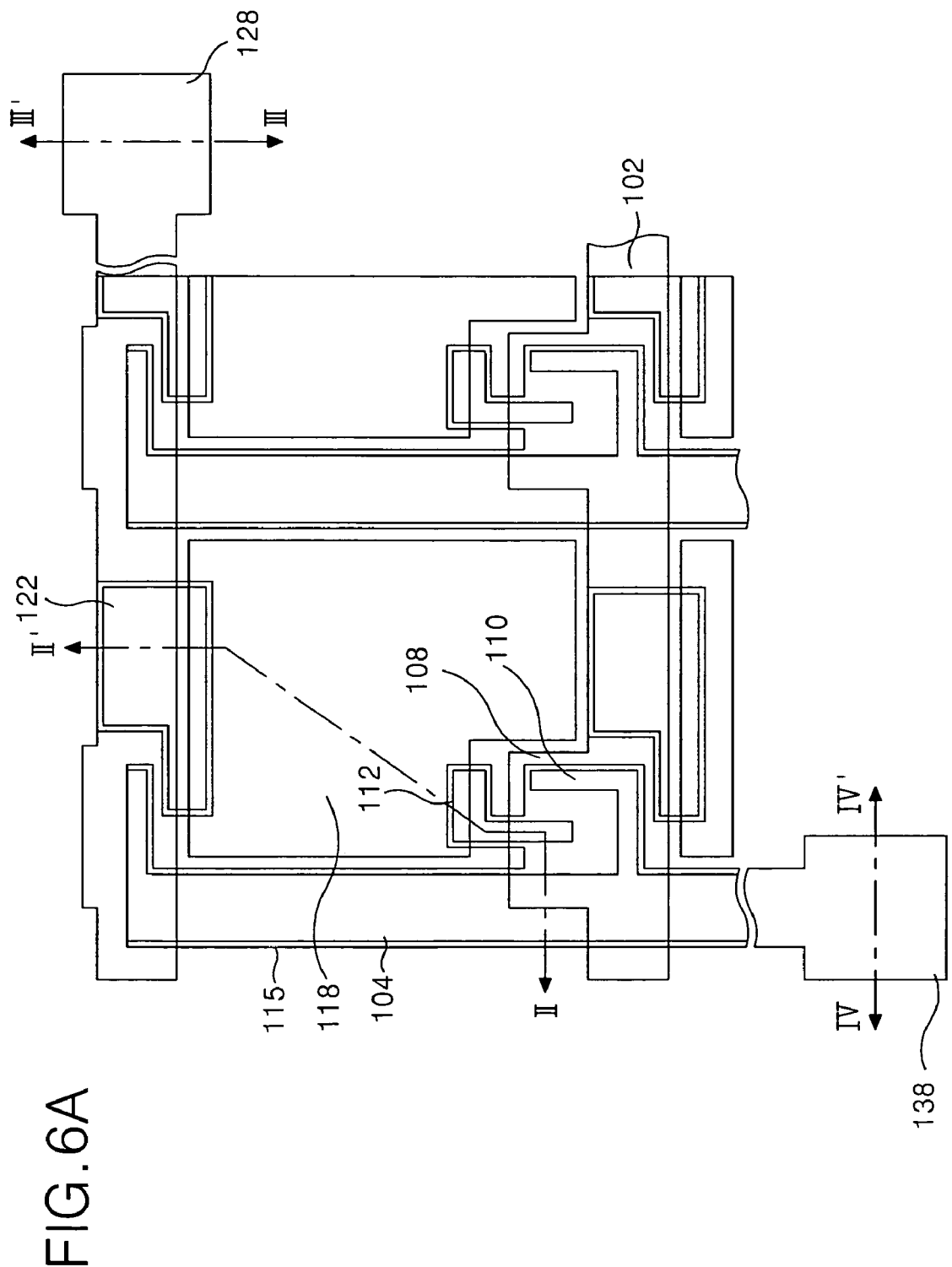

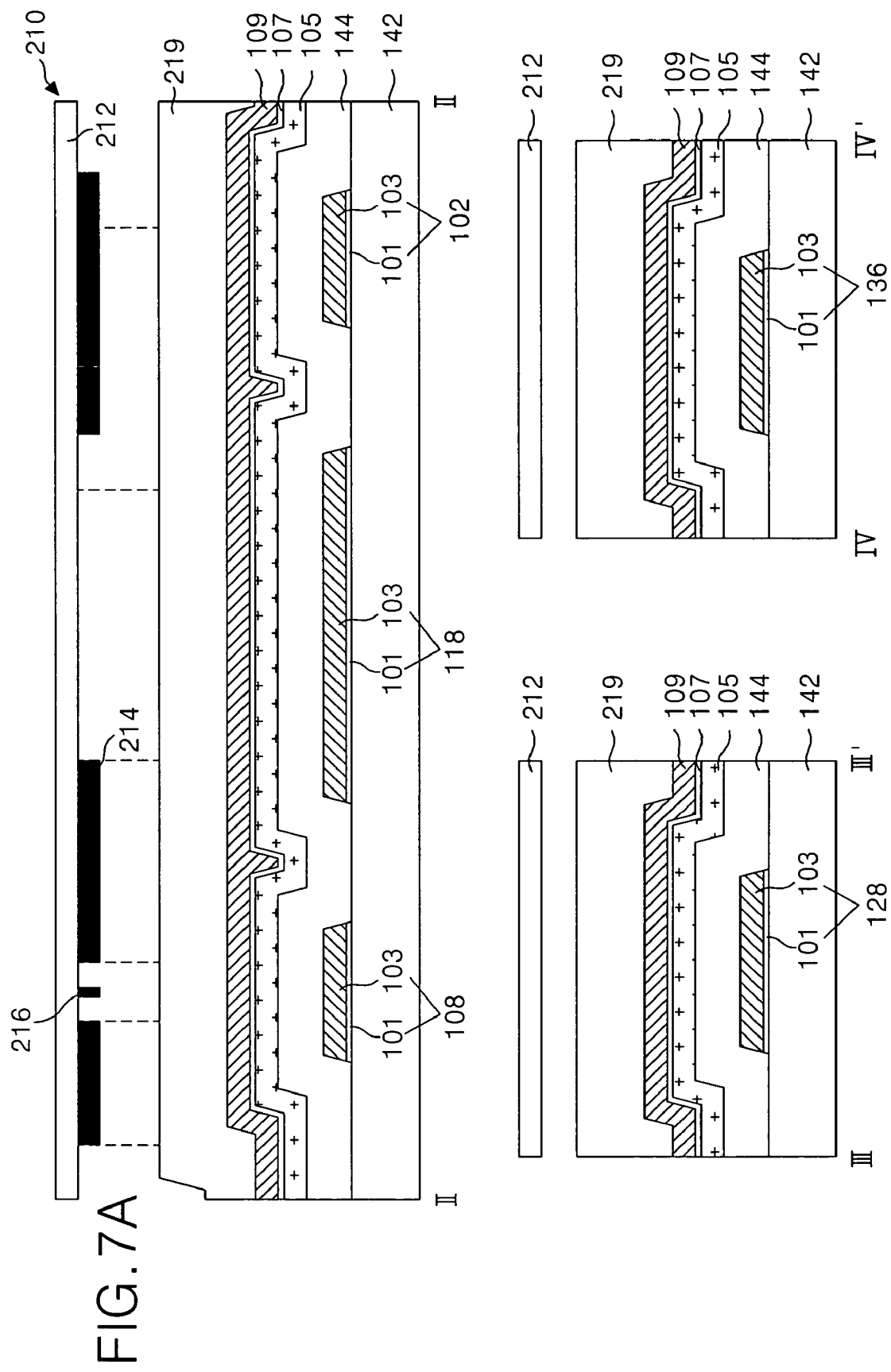

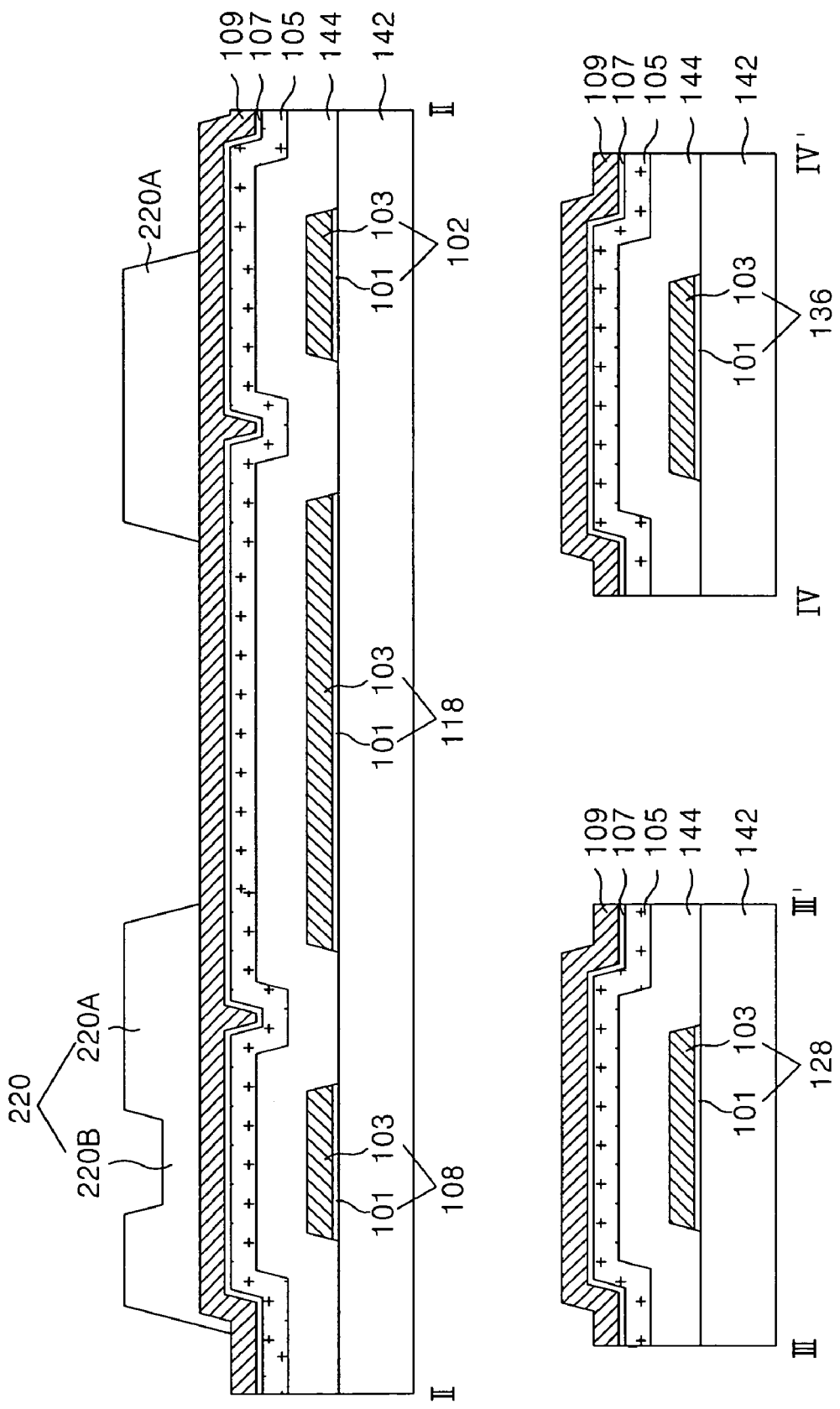

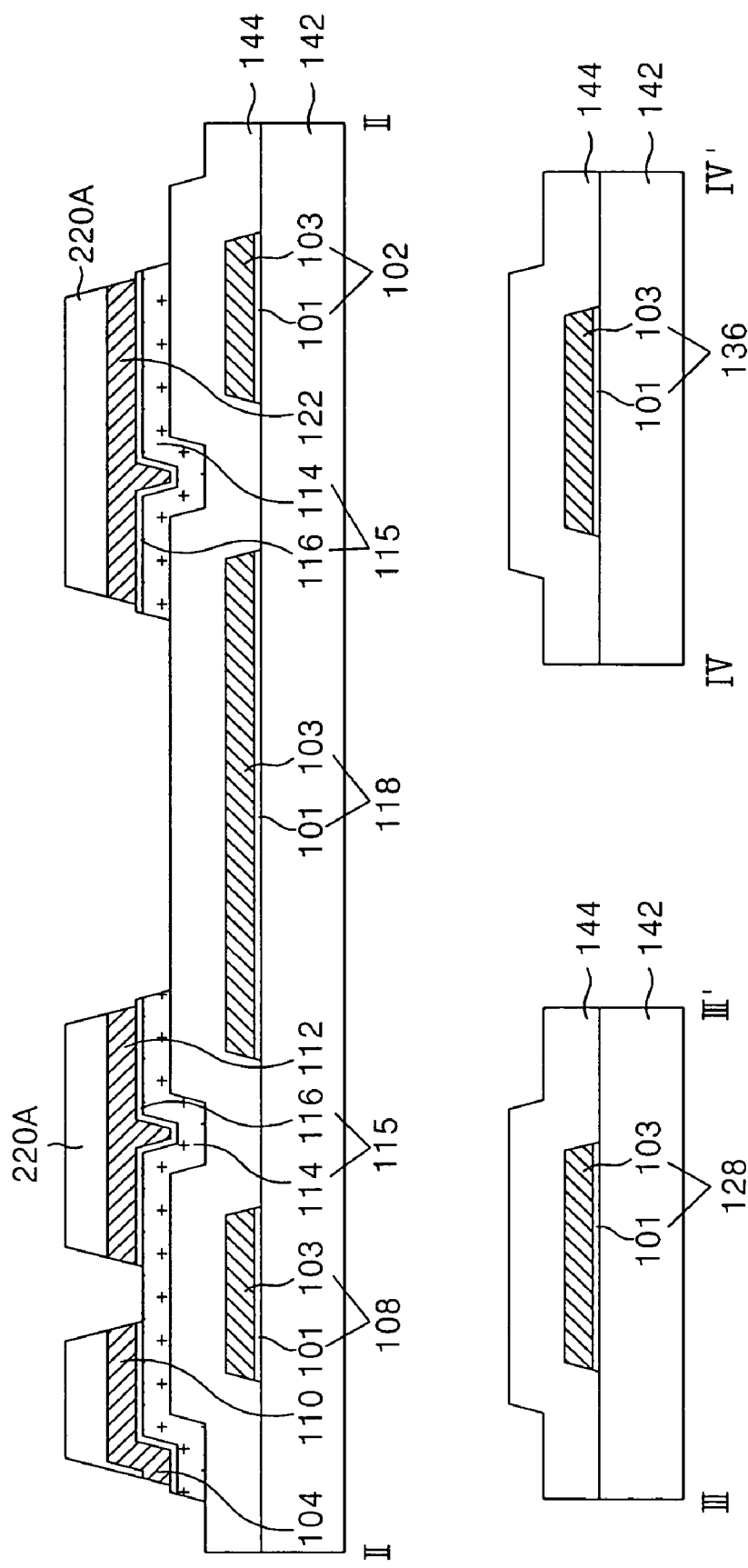

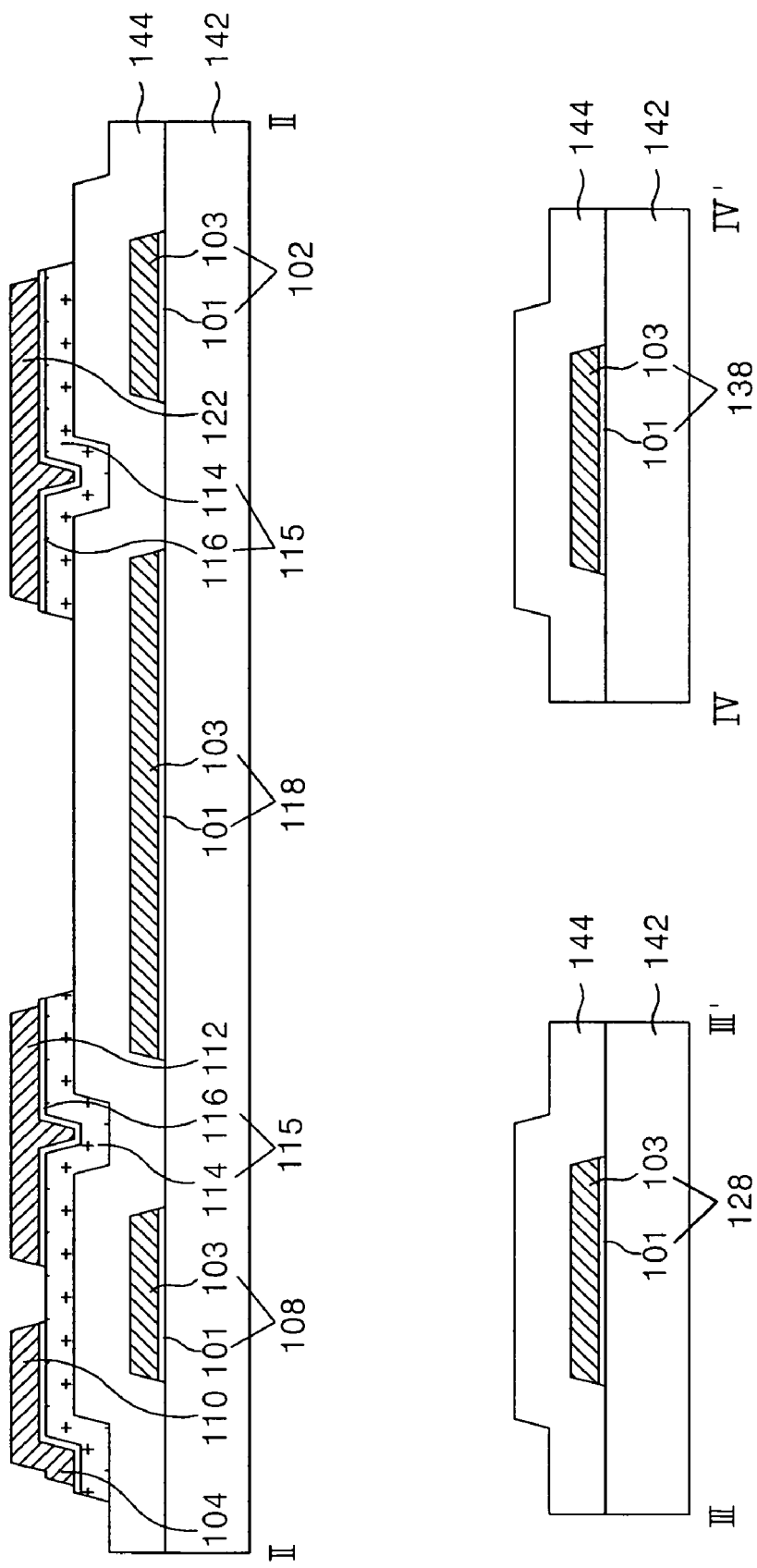

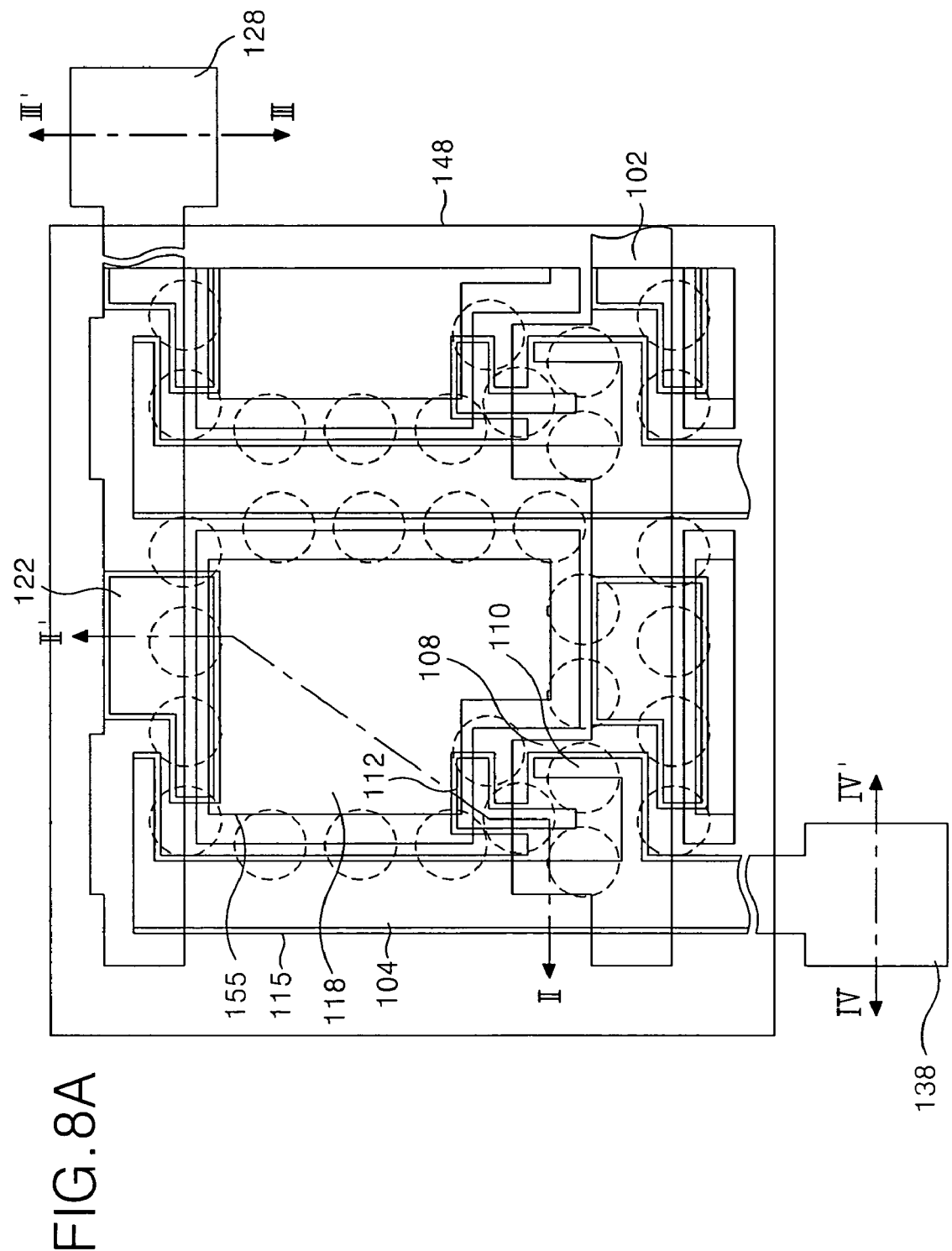

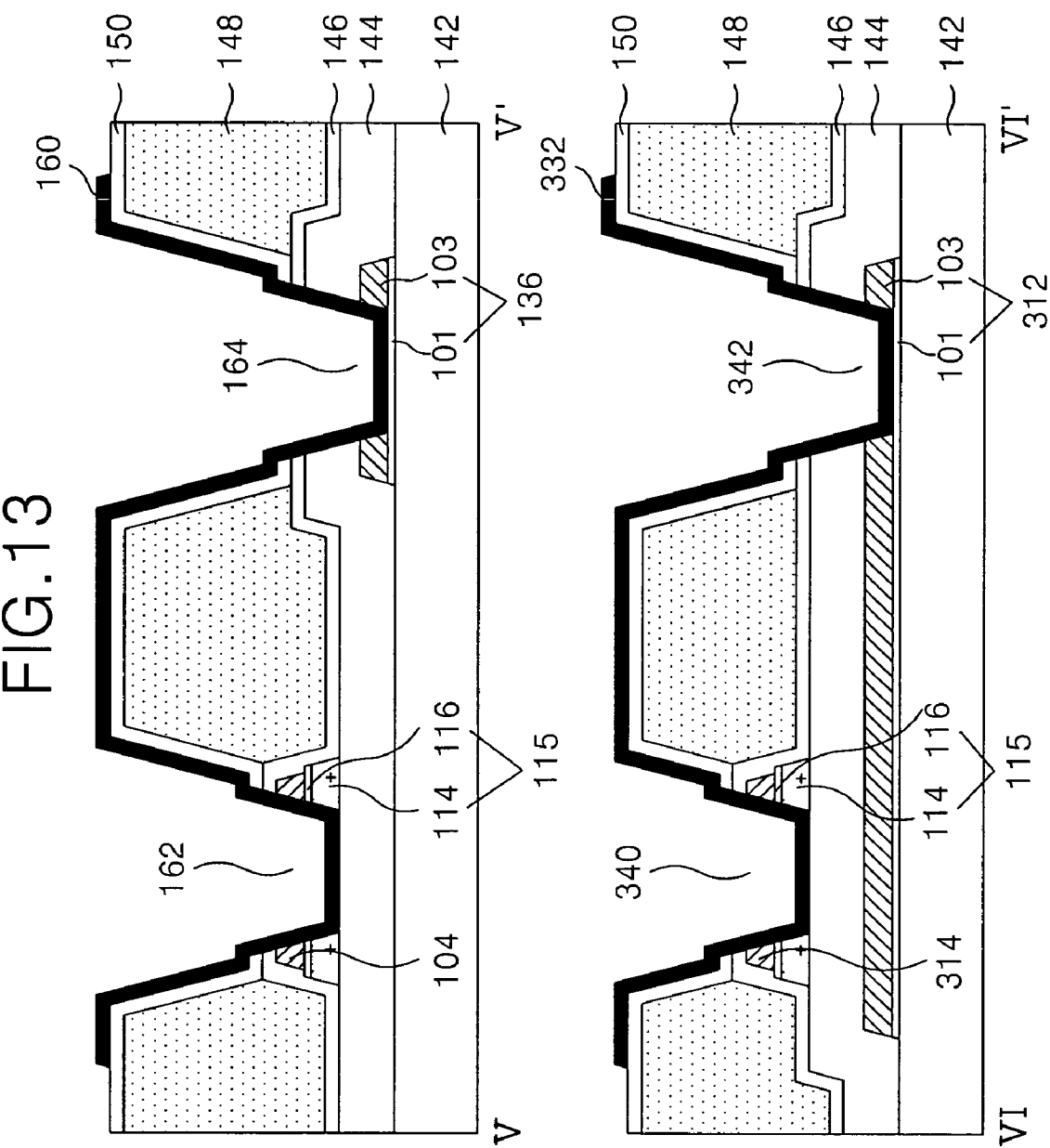

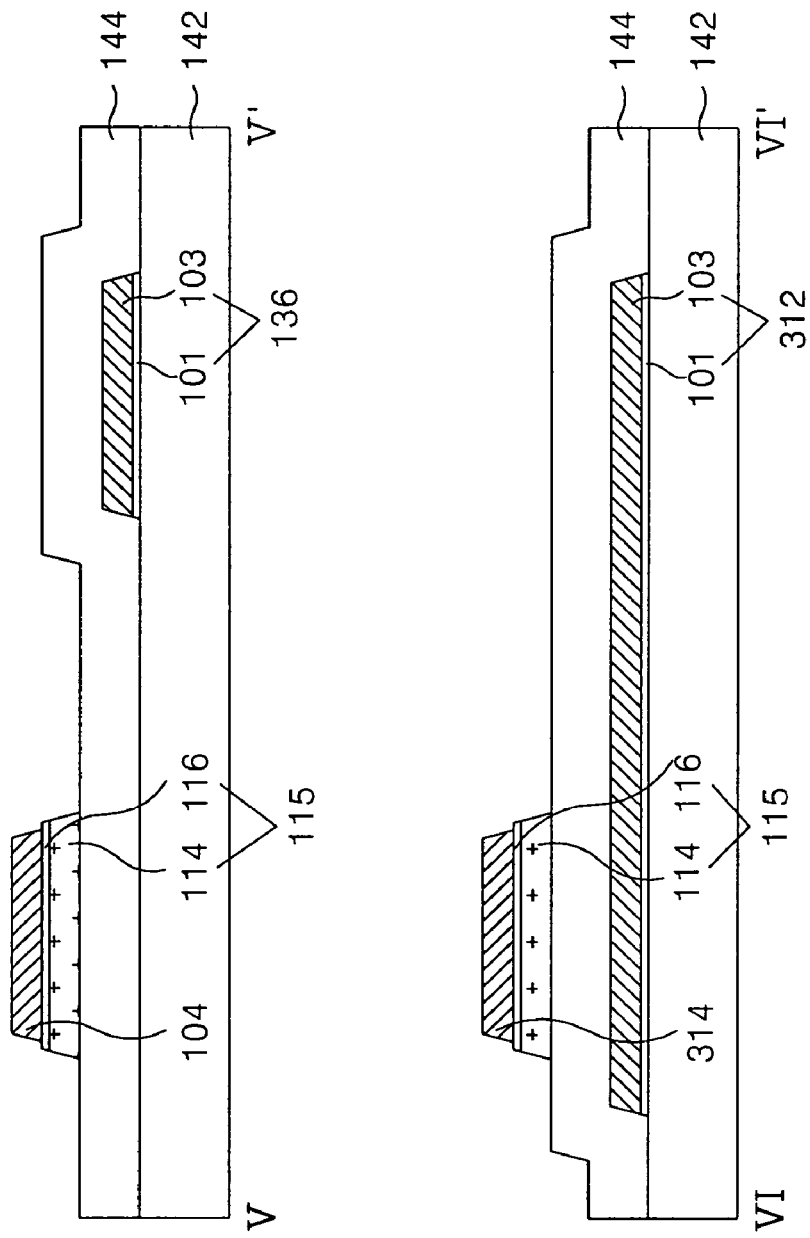

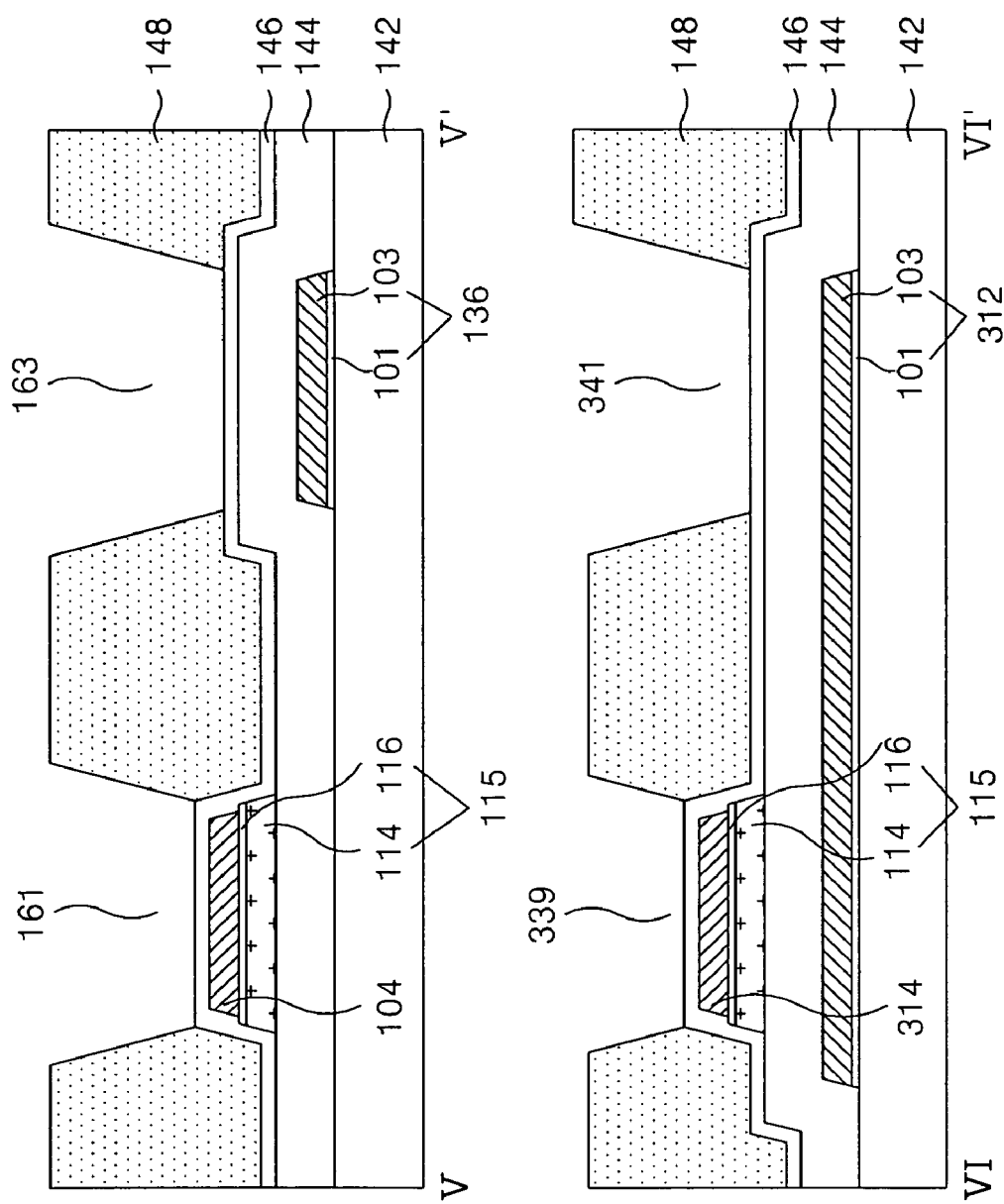

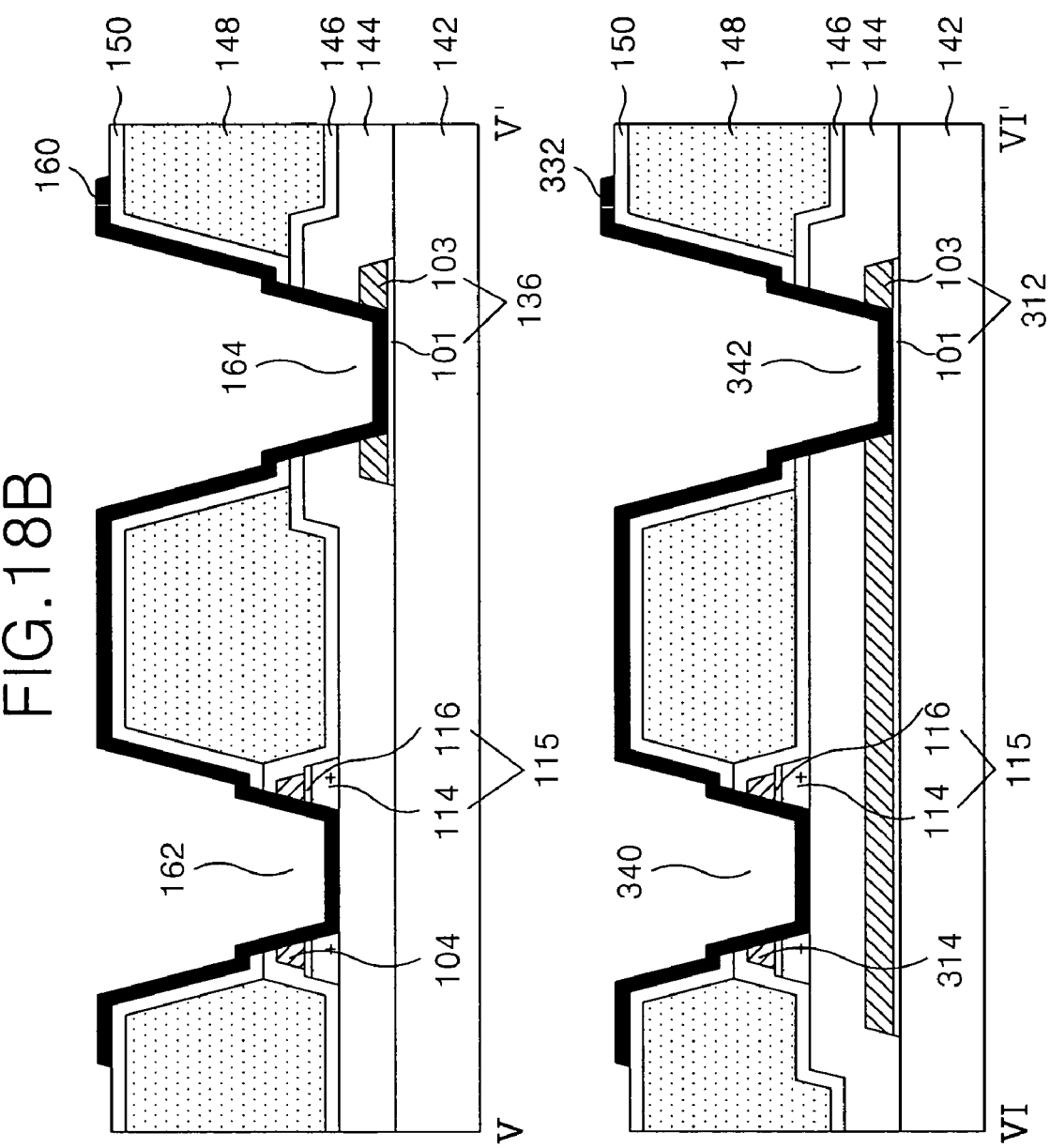

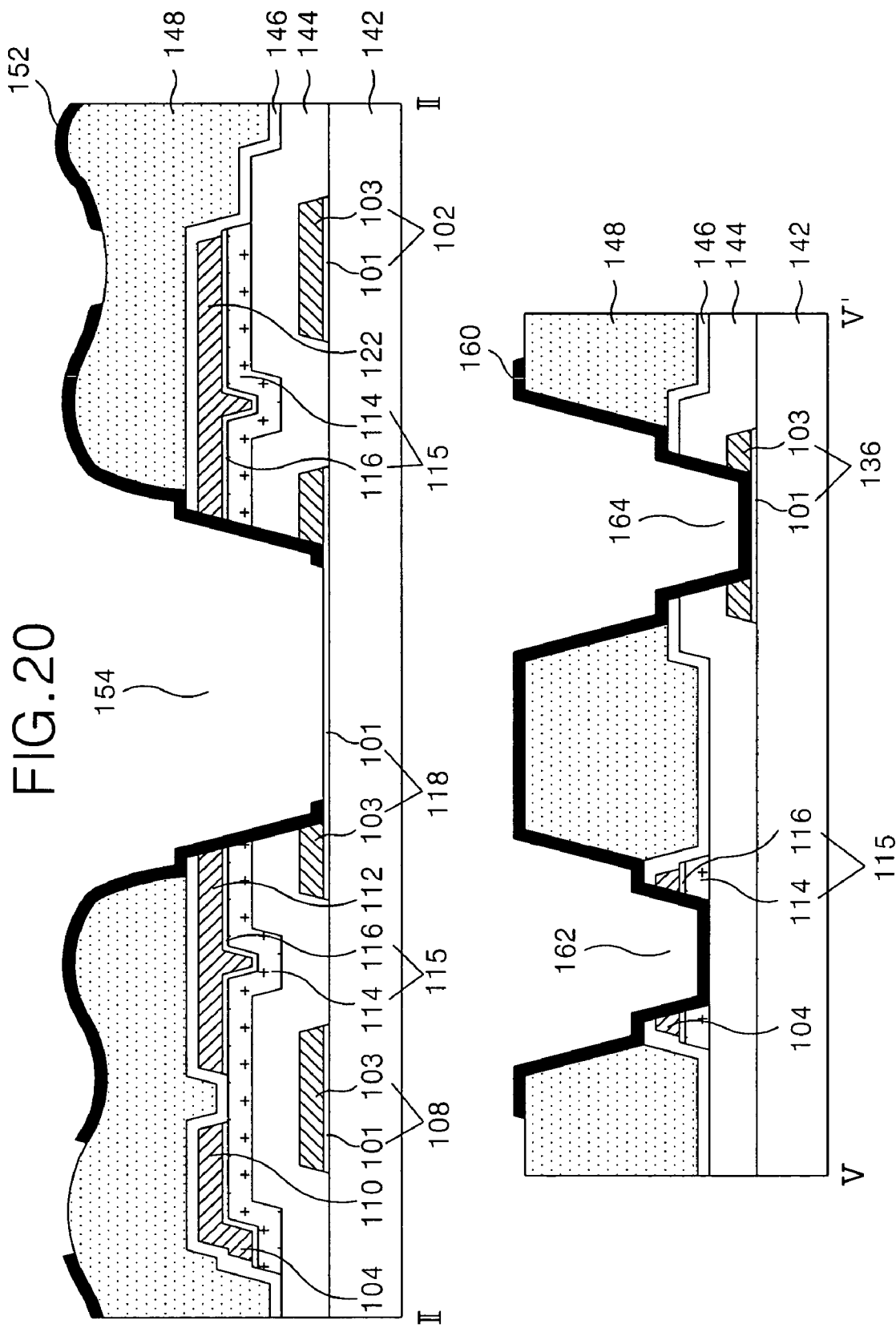

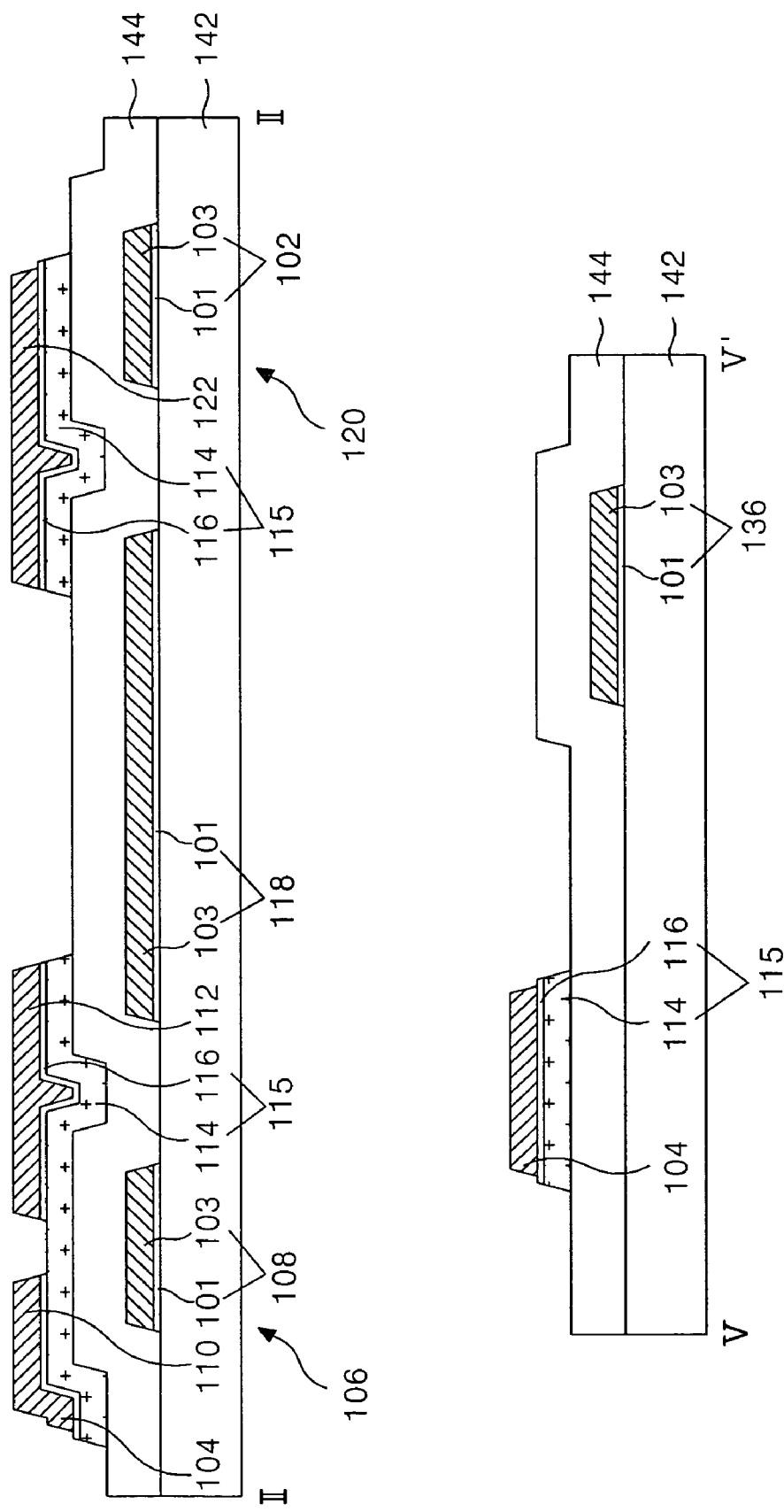

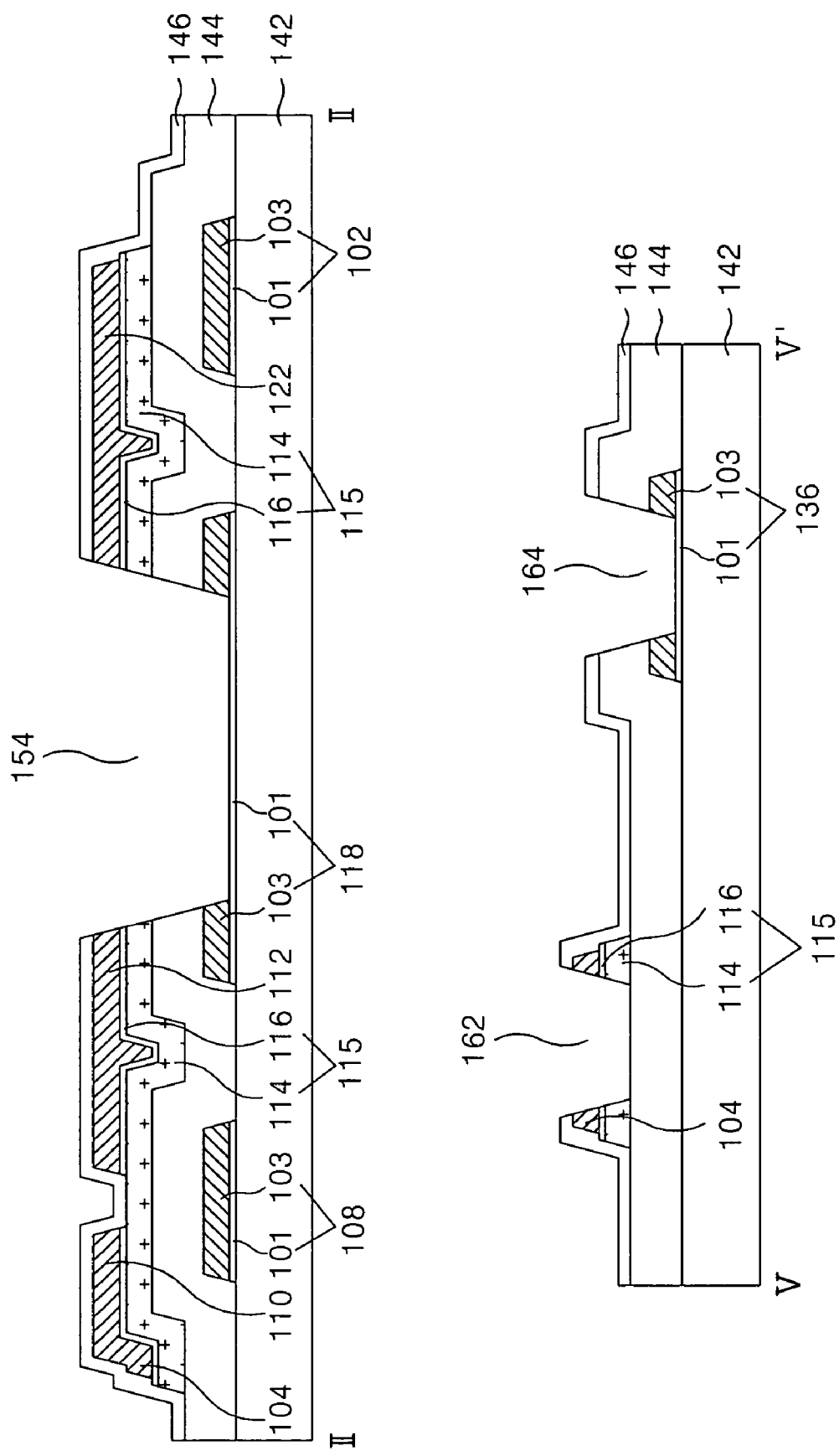

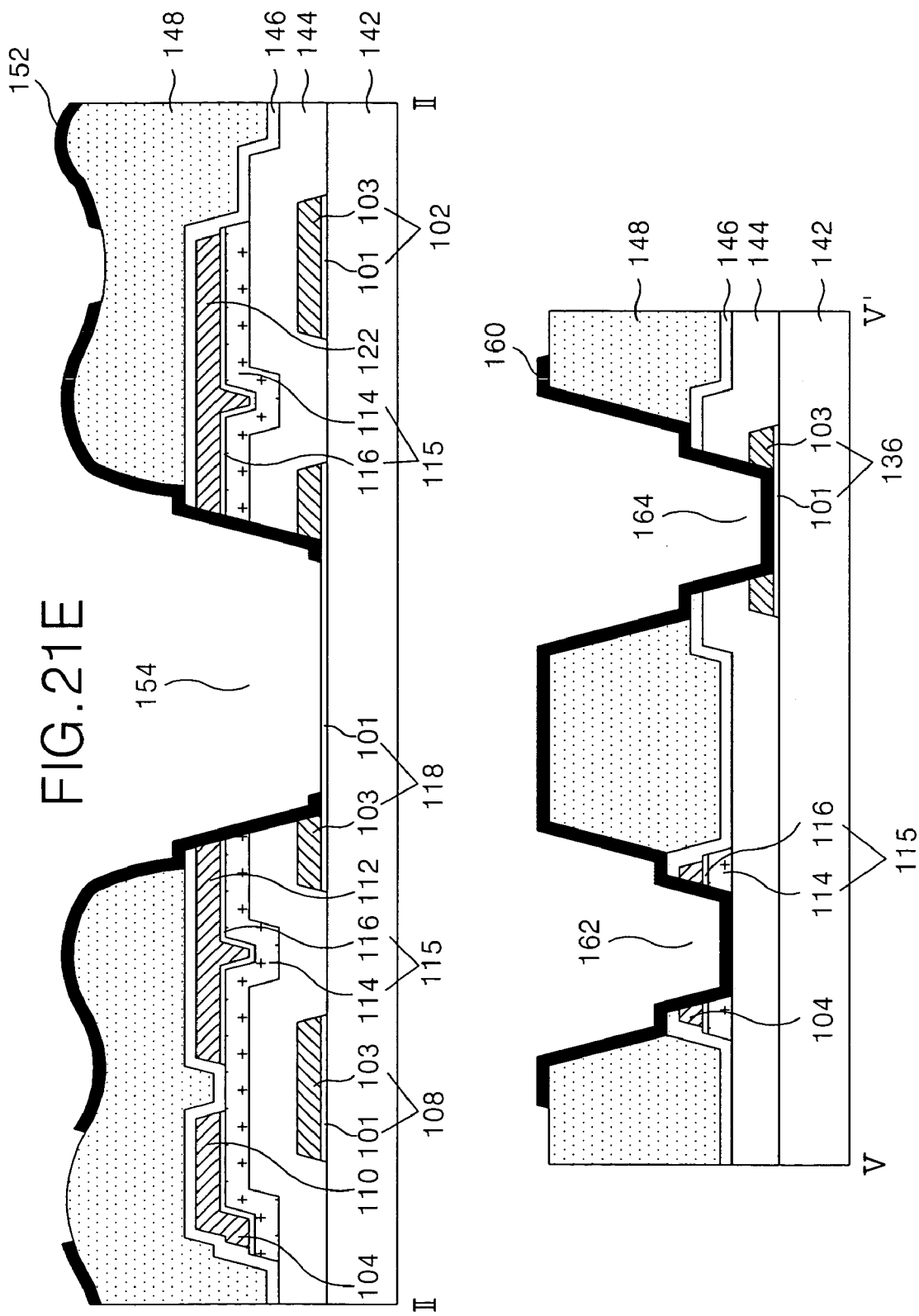

LIQUID CRYSTAL DISPLAY DEVICE AND METHOD OF FABRICATING SAME

This application claims the benefit of the Korean Patent Application No. P2004-041141, filed on Jun. 5, 2004, which is hereby incorporated by reference for all purposes as if fully set forth herein.

BACKGROUND OF THE INVENTION

1. Field of the Invention

The present invention relates to a transflective liquid crystal display device and method of fabricating same.

2. Description of the Related Art

Liquid crystal display devices are generally classified into two types: the transmissive type in which pictures are displayed using light supplied from a backlight unit, and the reflective type in which pictures are displayed using light reflected from an external source, such as natural light. There is a problem that the power consumption of a backlight unit is high in the transmissive type and the reflective type depends on the external light so as not to be able to display the picture in a dark environment.

In order to resolve such a problem, a transflective liquid crystal display device is on the rise, wherein the transflective liquid crystal can be selected to be in a transmissive mode where the backlight unit is used or in a reflective mode where the external light is used. The transflective liquid crystal display device operates in the reflective mode if the external light is sufficient and in the transmissive mode if the external light is not sufficient, thus it might be able to reduce the power consumption more than the transmissive liquid crystal display device and it is not restricted by the external light, which is different from the reflective liquid crystal display device.

Generally, a transflective liquid crystal display panel, as shown in FIG. 1, includes a color filter substrate and a thin film transistor substrate which are bonded together with a liquid crystal layer (not shown) between them, and a backlight unit arranged behind the thin film transistor substrate. Each pixel of the transflective liquid crystal display panel is divided into a reflective area where a reflective electrode 28 is formed, and a transmissive area where the reflective electrode 28 is not formed.

The color filter substrate includes a black matrix (not shown) and a color filter 54 formed on an upper substrate 52, and a common electrode 56 and an alignment film (not shown) formed there over.

The thin film transistor substrate includes a gate line 4 and a data line (not shown) formed on a lower substrate 2 that define each pixel area; a thin film transistor connected to the gate line 4 and the data line; a pixel electrode 32 formed at the pixel area and connected to the thin film transistor; and a reflective electrode 28 formed at a reflective area of each pixel to overlap the pixel electrode.

The thin film transistor includes a gate electrode 6 connected to the gate line 4; a source electrode 16 connected to the data line; a drain electrode 18 facing the source electrode 16; an active layer that overlaps the gate electrode 6 with a gate insulating film 8 there between to form a channel between the source and drain electrodes 16, 18; and an ohmic contact layer 12 to cause the active layer 10 to be in ohmic-contact with the source and drain electrodes 16 and 18. The thin film transistor responds to a scan signal of the gate line 4 to cause a video signal on the data line to be charged and maintained in the pixel electrode 32.

The reflective electrode 28 reflects an external light that is incident through a color filter substrate, toward the color filter substrate. The surface of the organic film 24 formed under the reflective electrode 28 has an embossed or raised shape, therefore the reflective electrode 28, which is formed on top of the organic film, also has an embossed shape. As a result, the reflection efficiency of the reflective electrode 28 increases due to the dispersion effect of the embossed surface.

When a pixel signal is applied to the pixel electrode 32 through the thin film transistor, a potential difference between a common electrode 56 and the pixel electrode 28 is generated. The potential difference causes a liquid crystal having dielectric anisotropy to rotate, thereby controlling the transmissivity of the light that runs through the liquid crystal layer in both the reflective and transmissive areas, thus its brightness is changed in accordance with the video signal.

In this case, a transmission hole 36 is formed in a relatively thick organic film 24 at a transmissive area so that the length of the light path going through the liquid crystal layer is the same in the reflective area as in the transmissive area. As a result, the length of the path RL that ambient light incident to the reflective area travels is the same as the length of the path TL that transmitted light from the backlight unit 60, thus the transmission efficiency is the same in both the reflective and transmissive modes.

The thin film transistor substrate further includes a storage capacitor connected to the pixel electrode 32 in order to stably maintain the video signal supplied to the pixel electrode 32. The storage capacitor is formed by having a storage upper electrode 20 overlap the gate line 4 with a gate insulating film there between, wherein the storage upper electrode 20 is connected to the pixel electrode 32. The ohmic contact layer 12 and the active layer 10 further overlap under the storage upper electrode 20 in the process.

The thin film transistor substrate further includes a first passivation film 22 between the thin film transistor and the organic film 24; a second passivation film between the organic film 24 and the reflective electrode 28; and a third passivation film 30 between the reflective electrode 28 and the pixel electrode 32. Accordingly, the pixel electrode 32 is connected to the drain electrode 18 and the storage upper electrode 20 through each of the first and second contact holes 34, 38 that penetrate the first to third passivation films 22, 26, 30, an organic film 24 and the reflective electrode 28.

In such a transflective liquid crystal display panel, the thin film transistor substrate includes the semiconductor process and requires a plurality of mask processes, thus its manufacturing process is complicated so that it becomes a material cause for the increase of the liquid crystal display panel manufacturing cost. Hereinafter, a fabricating method of the transflective thin film transistor substrate will be described in reference with FIGS. 2A to 2F.

Referring to FIG. 2A, a gate metal layer is formed on the lower substrate 2 using a deposition method such as sputtering. Subsequently, the gate metal layer is patterned with a first mask using a photolithography process and an etching process, thereby forming the gate pattern including the gate line 4 and the gate electrode 8. The gate metal layer is a single layered or double layered metal such as Al, Mo, Cr.

Next, the gate insulating film 8 is formed on the substrate 2 where the gate pattern is formed, and a source/drain pattern is formed on top thereof using a second mask process as illustrated in FIG. 2B The source/drain pattern includes the data line, the source electrode 16, the drain electrode 18 and the storage upper electrode 20.

The gate insulating film 8, an amorphous silicon layer 10, an amorphous silicon layer with impurities doped thereto 12, and the source/drain metal layer are sequentially formed on the lower substrate 2 where the gate pattern is formed. The gate insulating film 8 is an inorganic insulating material such as silicon oxide SiOx or silicon nitride SiNx, and the source/drain metal layer is a single or double layered metal structure such as Al, Mo and the like.

A photo resist pattern is formed on top of the source/drain metal layer using a second mask and a photolithography process. During this process, a diffractive exposure mask with a diffractive exposure part at a channel part of the thin film transistor is used as the second mask, thus the photo resist pattern of the channel part is made to have a lower height than the source/drain pattern part.

Thereafter, the source/drain metal layer is patterned by wet etching using the photo resist pattern to form the source/drain pattern that includes the data line, the source electrode 16, the drain electrode 18 integrated with the source electrode 16, and the storage upper electrode 20.

Next, an amorphous silicon layer doped with the impurities and an amorphous silicon layer are simultaneously patterned by a dry etching using the same photo resist pattern, thereby forming the ohmic contact layer 12 and the active layer 10.

After removing the photo resist pattern having relatively low height at the channel part by ashing, the source/drain pattern and the ohmic contact layer 12 of the channel part are dry etched. Accordingly, the active part 10 of the channel part is exposed to separate the source electrode 16 from the drain electrode 18. There after, the photo resist pattern remaining on the source/drain pattern is removed using a strip process.

Referring to FIG. 2C, a first passivation film 22 is formed on the gate insulating film 8 where the source/drain pattern is formed, and an organic film 24 is formed on top thereof using a third mask process, such that the organic film 24 has first and second initial contact holes 34, 38 and a transmission hole 36 with an embossed shaped surface.

The first passivation film 22 and the organic film 24 are sequentially formed on the gate insulating film 8 where the source/drain pattern is formed. The first passivation film 22 is of the same inorganic insulating material as the gate insulating film 8, and the organic film 24 is of a photosensitive organic material such as acrylic resin.

Then, the organic film 24 is patterned using the third mask, thereby forming first and second open holes 35, 37 and the transmission hole 36 which penetrate the organic film 24 in correspondence to the transmissive part of the third mask. The third mask has a structure where a shielding part and a diffractive exposure part repeat at the rest area except for the transmissive part. The organic film 24 remaining in correspondence thereto is patterned to have a structure that a shielding area (projected part) and a diffractive exposure area (groove part) having a stepped difference are repeated. Subsequently, the organic film 24 where the projected part and the groove part are repeated is cured so that the surface of the organic film 24 has the embossed shape.

Referring to FIG. 2D, a second passivation film 26 is formed on the organic film 24, and the reflective electrode 28 is formed on top thereof using a fourth mask process. The second passivation film 26 and the reflective metal layer are deposited to maintain their embossed shape on top of the organic film 24 that has the same embossed surface. The second passivation film 26 is an inorganic insulating material such as the first passivation film 22, and the reflective metal layer is a metal with high reflectivity such as AlNd.

Subsequently, the reflective metal layer is patterned using a fourth mask and etching process, thus the reflective electrode 28 is formed, wherein the reflective electrode is independent every pixel and is opened at the transmission hole 36 and the first and second open holes 35, 37 of the organic film 24.

Referring to FIG. 2E, a third passivation film 30 covering the reflective electrode 28 is formed using a fifth mask process, and first and second contact holes 34, 38 penetrating the first to third passivation films 22, 26, 30 are formed. The third passivation film 30 the reflective electrode 28 and the first and second contact holes 34, 38 are formed with the fifth mask using photolithography and etching processes, such that the first and second contact holes 34, 38 penetrate the first to third passivation films 22, 26, 30 at the first and second open holes 35, 37 of the organic film 24. The first and second contact holes 34, 38 each expose the drain electrode 18 and the storage upper electrode 20. The third passivation film is of the same inorganic insulating material as the second passivation film.

Referring to FIG. 2F, a pixel electrode 32 is formed on the third passivation film 30 by use of a sixth mask process. More specifically, a transparent conductive layer is formed on the third passivation film 30 using a deposition method such as sputtering, and the transparent conductive layer is patterned by the photolithography process using a sixth mask and the etching process to form the pixel electrode at each pixel area. The pixel electrode 32 is connected to the drain electrode 18 and the storage upper electrode 20 through the first and second contact holes 34 and 38. The transparent conductive layer is of indium tin oxide ITO.

Accordingly, the related art transflective thin film transistor substrate is formed using six 6 different mask processes, thus there is a disadvantage that its manufacturing process is complicated. Further, the margin of the first and second contact holes 34, 38 should be secured sufficiently in order for the pixel electrode 32 to be connected to the drain electrode 18 and the storage upper electrode 20 in the related art transflective thin film transistor substrate. Because of this, there is a disadvantage that the aperture ratio of the transmissive area is reduced.

SUMMARY OF THE INVENTION

Accordingly, the present invention is directed to a transflective liquid crystal display device and method of manufacturing same that that substantially obviates one or more of the problems due to limitations and disadvantages of the related art.

Accordingly, an advantage of the present invention is to provide a transflective thin film transistor substrate with increased aperture ratio in a transmissive area, and a simplified method of fabricating same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings To achieve these and other advantages an in accordance with the purpose of the present invention, as embodied and broadly described, a liquid crystal display device, comprising: a gate line; a first insulating film on the gate line; a data line crossing the gate line to define a pixel region, the pixel region having a transmissive area and a reflective area; a thin film transistor connected to the gate line and the data line; a pixel electrode formed in the pixel region; a second insulating film on the thin film transistor; a storage capacitor including a storage upper electrode overlapping the gate line; a transmission hole exposing at least a portion of the pixel electrode, and a reflective electrode formed in the reflective area of the pixel region, the reflective electrode connecting the pixel electrode with thin film transistor and the storage upper electrode, wherein the gate line and the pixel electrode include a first transparent conductive layer.

In another aspect of the present invention, a method of fabricating a liquid crystal display device is provided, comprising: forming a gate pattern including a first transparent conductive layer using a first mask, the gate pattern including a pixel electrode, a gate electrode and a gate line; forming a first insulating film on the gate pattern; forming a semiconductor layer and a source/drain pattern on the first insulating film using a second mask, the source/drain pattern having a storage upper electrode, a drain electrode, a source electrode, and a data line; forming a second insulating film over the source/drain pattern having an aperture portion using a third mask; forming a transmission hole exposing the first transparent conductive layer of the pixel electrode using a fourth mask; and forming a reflective electrode in a reflective area using a fifth mask; the reflective electrode connecting the pixel electrode with the drain electrode and the storage upper electrode through the transmission hole.

In another aspect of the present invention, a method of fabricating a liquid crystal display device is provided, comprising: forming a gate pattern having a first transparent conductive layer and a second opaque second conductive layer using a first mask, the gate pattern including a pixel electrode, a gate electrode and a gate line; forming a first insulating film and a semiconductor layer on the gate pattern, and a source/drain pattern having a storage upper electrode, a drain electrode, a source electrode, a data line using a second mask; forming a transmission hole exposing the first conductive layer of the pixel electrode in a transmission area using a third mask; forming a second insulating film over the source/drain pattern using a fourth mask; and forming a reflective electrode in a reflective area using a fifth mask, the reflective electrode connecting the pixel electrode with the drain electrode and the storage electrode through the transmission hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings:

FIG. 1 is a sectional diagram illustrating a part of a related art transflective liquid crystal display panel;

FIG. 3 is a plane view illustrating a transflective thin film transistor substrate according to an embodiment of the present invention;

FIGS. 6A and 6B illustrate a plane view and a sectional diagram, respectively, of a second mask process according to an embodiment of the present invention;

FIGS. 7A to 7E are sectional diagrams further illustrating a second mask process of the present invention;

FIGS. 8A and 8B illustrate a plane view and a sectional diagram, respectively, of a third mask process according to an embodiment of the present invention;

FIG. 13 is sectional diagram illustrating the transflective thin film transistor substrate shown in FIG. 12, taken along the line V-V' and VI-VI';

FIGS. 15A and 15B illustrate a plane view and a sectional diagram, respectively, of a second mask process according to the other embodiment of the invention;

FIGS. 16A and 16B illustrate a plane view and a sectional diagram, respectively, of a third mask process according to the other embodiment of the invention;

FIGS. 18A and 18B illustrate a plane view and a sectional diagram, respectively, of a fifth mask process according to the other embodiment of the invention;

FIG. 20 is a sectional diagram illustrating the thin film transistor substrate according to another embodiment of the present invention; and FIGS. 21A to 21E are sectional diagrams illustrating a method of fabricating of the transflective thin film transistor substrate illustrated in FIG. 20.

DETAILED DESCRIPTION OF THE ILLUSTRATED EMBODIMENT

Reference will now be made in detail to embodiments of the present invention, examples of which are illustrated in the accompanying drawings.

Figure 2A:
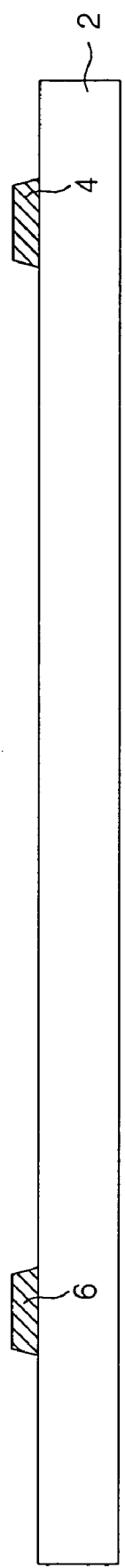
FIGS. 2A to 2F are sectional diagrams illustrating a method of fabricating a transflective thin film transistor substrate according to the related art.
Figure 2B:
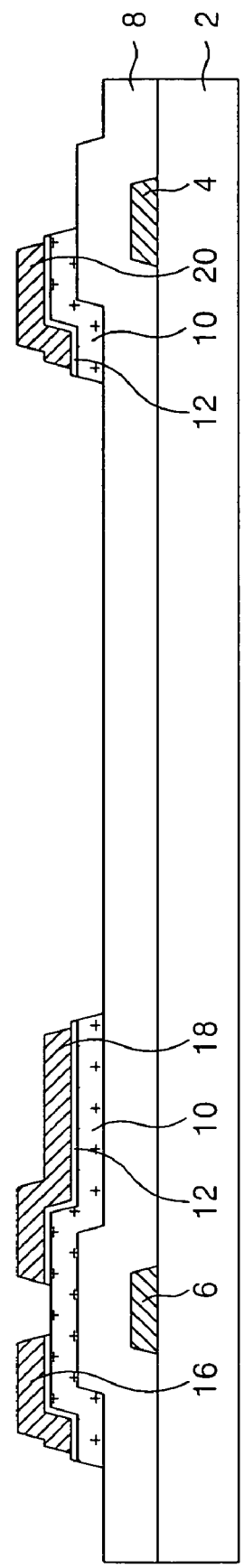
Figure 2C:
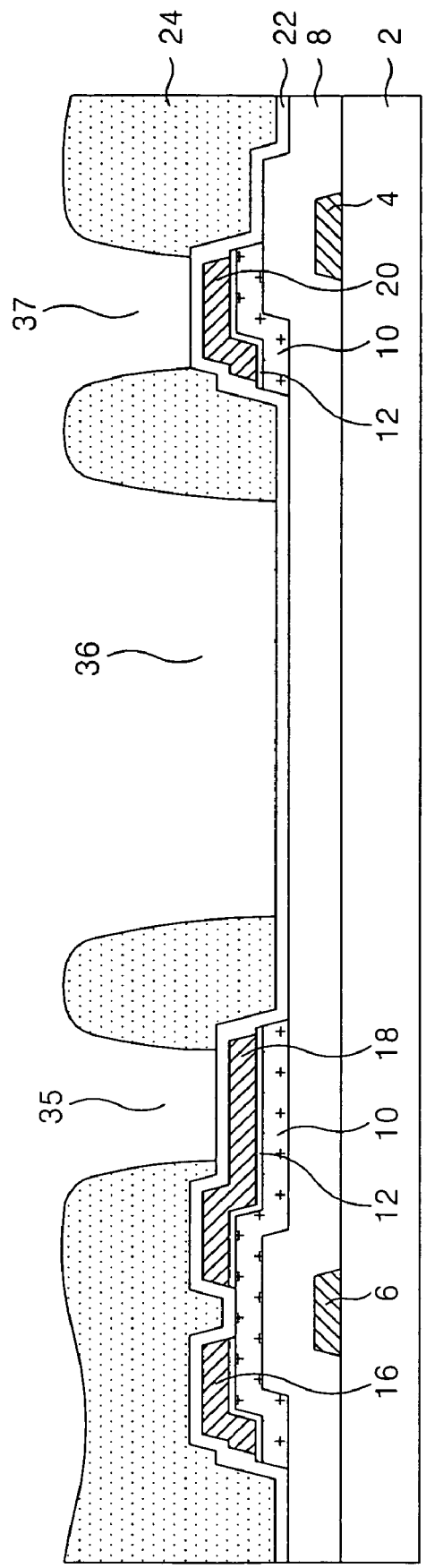
Figure 2D:
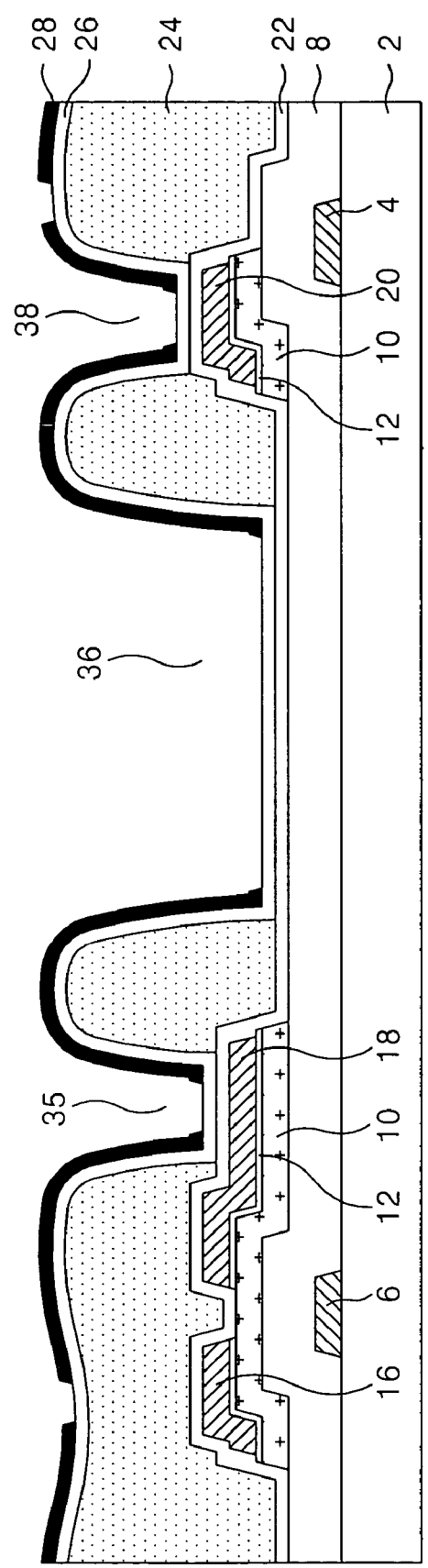
Figure 2E:
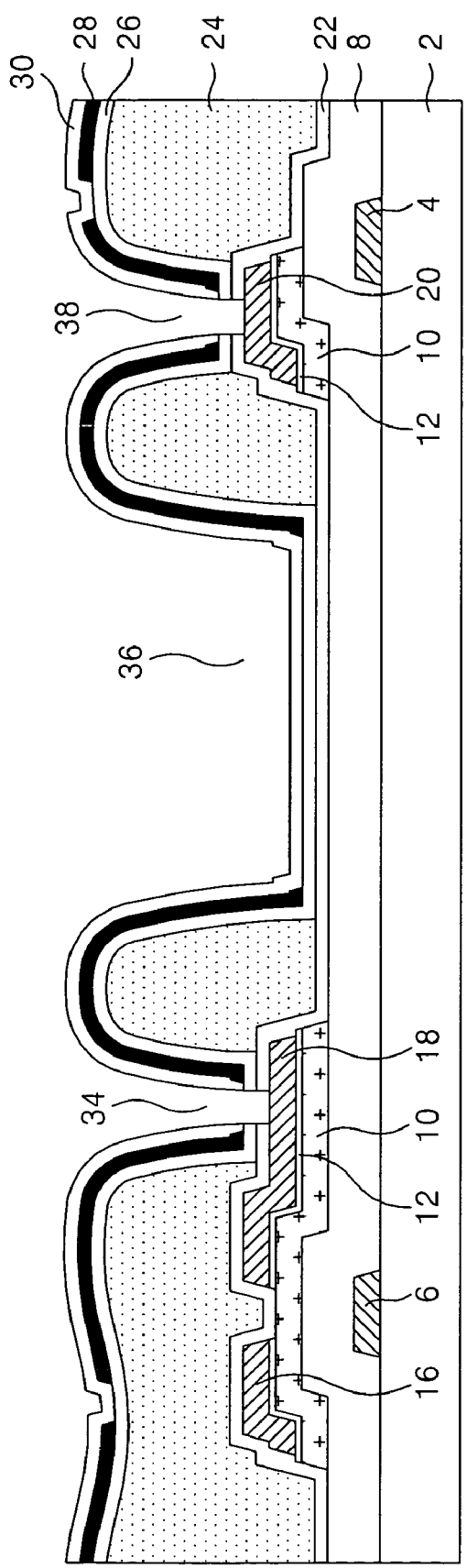
Figure 2F:
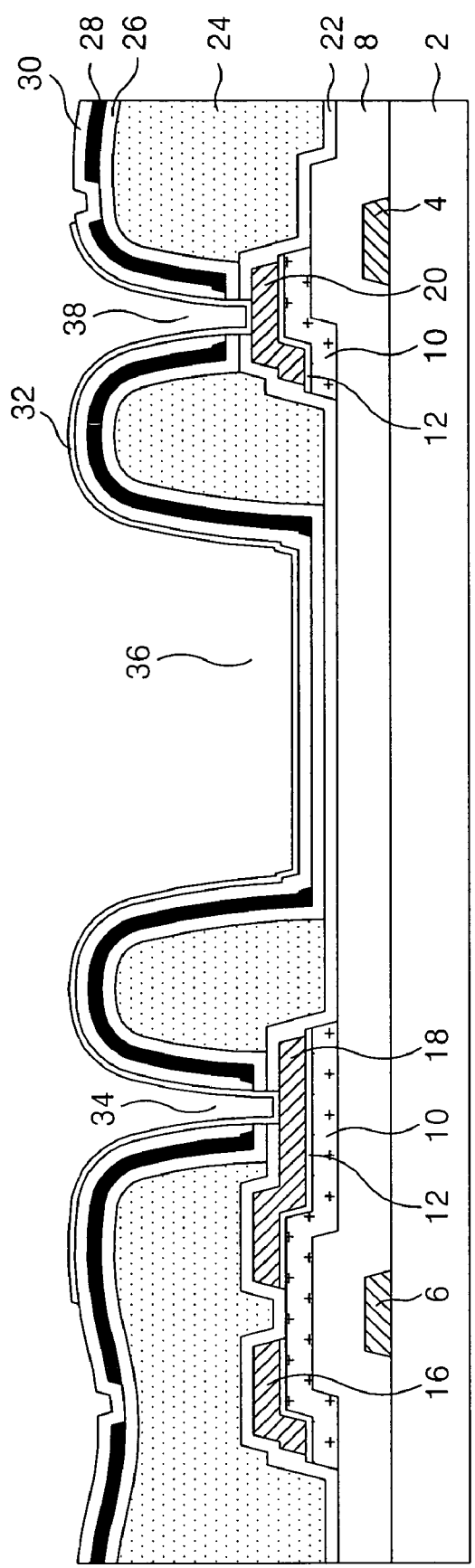
Figure 4:
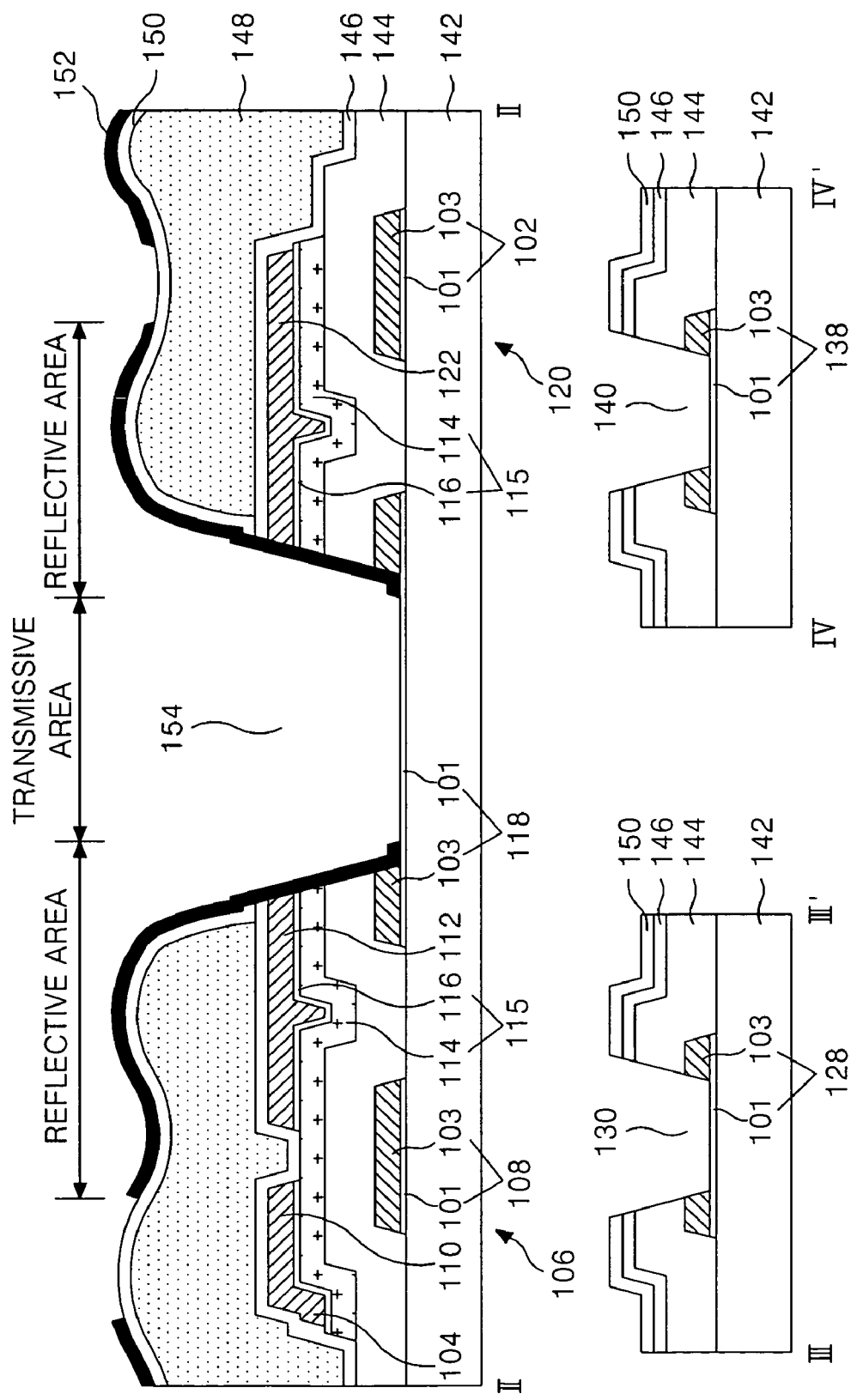
FIG. 4 is a sectional diagram illustrating the transflective thin film transistor substrate shown in FIG. 3, taken along the line II-II', III-III, IV-IV'.

FIG. 3 is a plane view illustrating a transflective thin film transistor substrate according to the present invention, and FIG. 4 is a sectional diagram illustrating the transflective thin film transistor substrate illustrated in FIG. 3, taken along the line II-II', III-III', IV-IV'.

Referring to FIGS. 3 and 4, the transflective thin film transistor substrate includes a gate line 102 and a data line 104 that define a pixel area on a lower substrate 142 by crossing each other with a gate insulating film 144 there between; a thin film transistor 106 connected to the gate line 102 and the data line 104; a reflective electrode 152 formed in a reflective area of each pixel; and a pixel electrode 118 formed at each pixel area and connected to the thin film transistor 106 through the reflective electrode 152. The transflective thin film transistor substrate also includes a storage capacitor 120 that is formed by the overlapping of the previous stage gate line 102 and a storage upper electrode 122 connected to a pixel electrode 118 through a reflective electrode 152; a gate pad 128 connected to the gate line 102; and a data pad 138 connected to the data line 104. The transflective thin film transistor substrate divides each pixel area into a reflective area where the reflective electrode 152 is formed and a transmissive area where the reflective electrode 152 is not formed.

The thin film transistor 106 includes a gate electrode 108 connected to the gate line 102; a source electrode 110 connected to the data line 104; a drain electrode 112 facing the source electrode 110 to be connected to the pixel electrode 118; an active layer 114 that overlaps the gate electrode 108 with a gate insulating film 144 therebetween to form a channel between the source electrode 110 and the drain electrodes 112; and an ohmic contact layer 116 formed on the active layer 114 except for a channel part so as to be in ohmic-contact with the source electrode 110 and the drain electrodes 112.

The thin film transistor 106 responds to a scan signal on the gate line 102 to cause a video signal on the data line 104 to be charged and maintained in the pixel electrode 118.

As illustrated in FIG. 4, the gate line 102 and the gate electrode 108 have a double layer structure including a first transparent conductive layer 101 and a second conductive metal layer 103 deposited on top of thereof. A semiconductor pattern 115 including the active layer 114 and the ohmic contact layer 116 is formed such that it overlaps the data line 104.

The reflective electrode 152 is formed in the reflective area of each pixel to reflect external light. The reflective electrode 152 has an embossed shape corresponding to the shape of the second passivation film 150 and the organic film 148 there under. The embossed shape of the reflective electrode increases its reflection efficiency due to the dispersion effect.

The pixel electrode 118 is formed at each pixel area and connected to the drain electrode 112 through the reflective electrode 152 that goes through an edge part of a transmission hole 154. The pixel electrode 118 has a double structure that the first and second conductive layers 101, 103 are formed like the gate line 102, and it is opened through the transmission hole 154 to make the first conductive layer 101 being the transparent conductive layer exposed to the transmissive area.

The pixel electrode 118 generates a potential difference with a common electrode of a color filter substrate (not shown) by the pixel signal supplied through the thin film transistor. The potential difference causes a liquid crystal having dielectric anisotropy to rotate, thereby controlling the transmissivity of the light that runs through a liquid crystal layer of each of the reflective area and the transmissive area, thus its brightness is changed in accordance with the video signal.

The transmission hole 154 is formed in the transmissive area to penetrate a gate insulating film 144 on the pixel electrode 118, and a first passivation film 146, an organic film 148 and a second passivation film 150 on the thin film transistor 106. Accordingly, the length of the light path that runs through the liquid crystal layer is the same in the reflective area and the transmissive area, thus the transmission efficiency of the reflective mode and the transmissive mode is the same.

The storage upper electrode 122 connected to the pixel electrode 118 overlaps the previous gate line 102 with the gate insulating film 144 therebetween, thereby forming the storage capacitor 120. The storage upper electrode 122 is connected to the pixel electrode 118 through the reflective electrode 152 that runs through the edge part of the transmission hole 154, and it further overlaps the semiconductor pattern 115 under the storage upper electrode 122.

The gate line 102 is connected to a gate driver (not shown) through the gate pad 128. The first and second conductive layers 101, 103 of the gate line 102 are extended to form the gate pad 128, and the first conductive layer 101 is exposed through a first contact hole 130 that penetrates from the second passivation film 150 to the second conductive layer 103.

The data line 104 is connected to a data driver (not shown) through the data pad 138. The data pad 138 has a double structure that the first and second conductive layers 101, 103 are formed like the gate pad 128, and the first conductive layer 101 is exposed through the second contact hole 140 that penetrates from the second passivation film 150 to the second conductive layer 103. The data pad 138 is connected to the data line 104 through a separate contact electrode (not shown).

In this way, the transflective thin film transistor substrate according to this embodiment of the present invention has the pixel electrode 118 connected to the drain electrode 112 and the storage upper electrode 122 through the reflective electrode that runs through the edge part of the transmission hole 154. Accordingly, it is not necessary to have a separate contact hole for connecting the pixel electrode 118 with the drain electrode 112 and the storage upper electrode 122, thus the aperture ratio of the transmissive area can be increased as much.

The reflective electrode 152 is also connected to the first and second conductive layers 101, 103 of the pixel electrode 118. Accordingly, AlNd and ITO are connected through Mo in case that AlNd is used for the reflective electrode 152, ITO is used for the first conductive layer 101 of the pixel electrode 118 and Mo is used for the second conductive layer 103, thus the contact resistance of AlNd and ITO caused by the generation of Al2O3 might be able to be reduced.

Figure 5A:
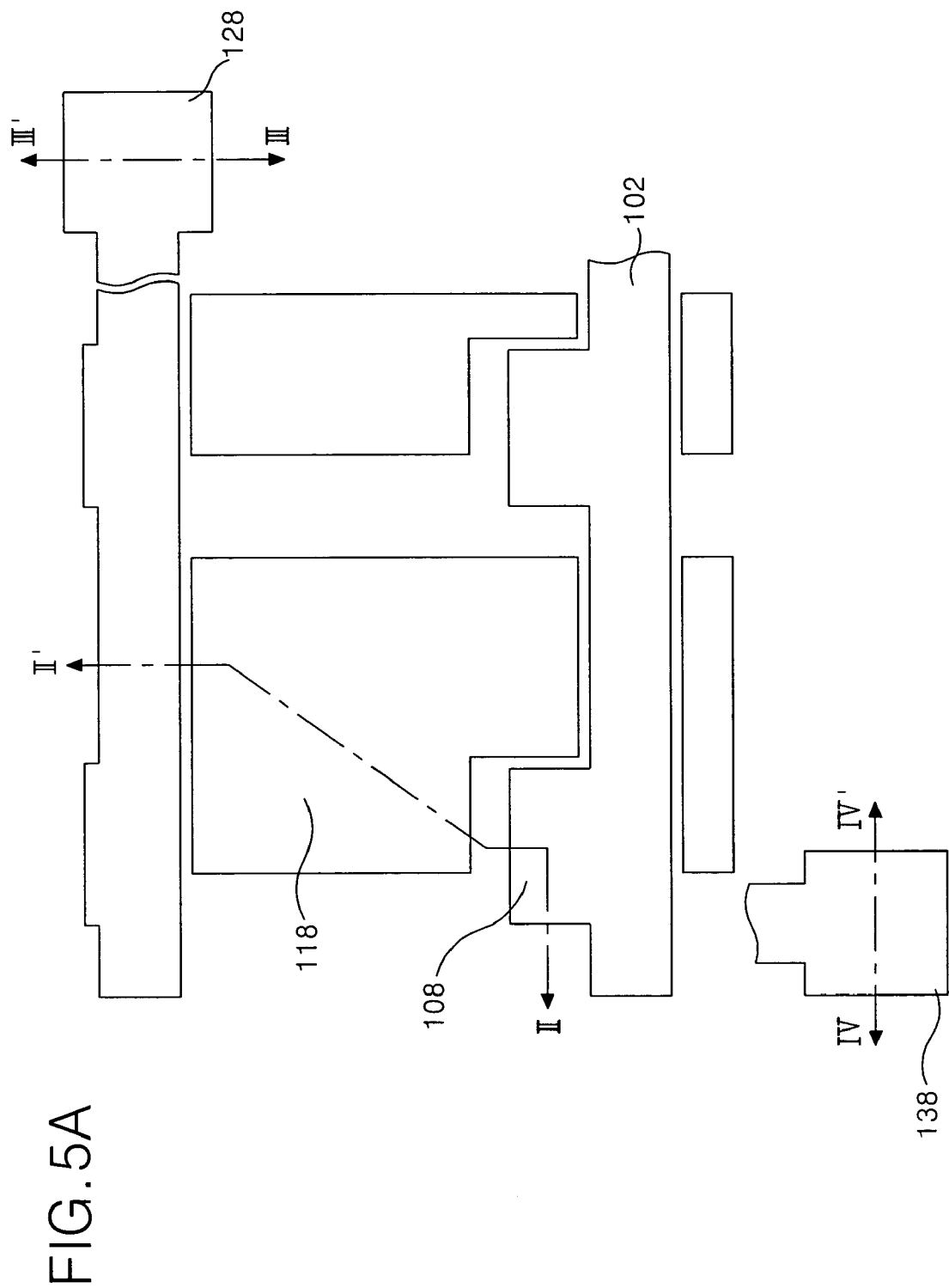
FIGS. 5A and 5B illustrate a plane view and a sectional diagram, respectively, of a first mask process according to an embodiment of the present invention.
Figure 5B:
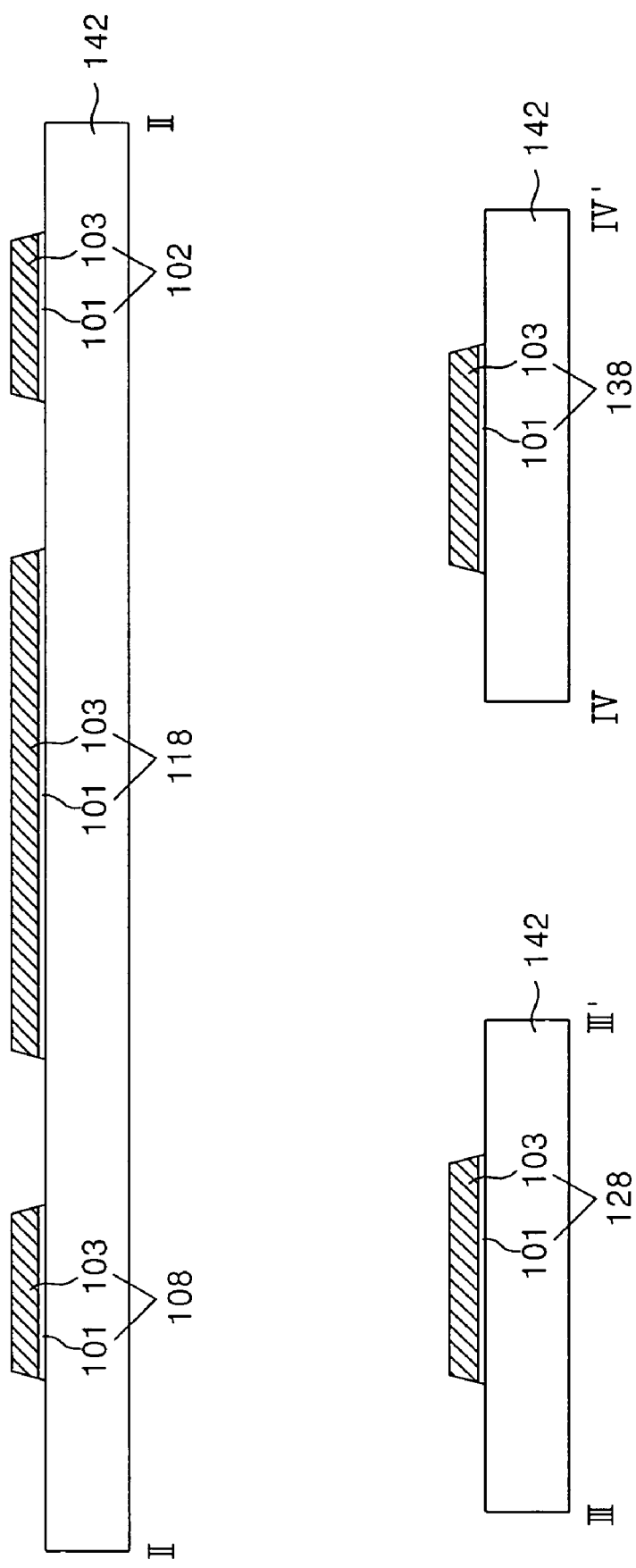

FIGS. 5A and 5B illustrate a plane view and a sectional diagram respectively, of a first mask process according to an embodiment of the present invention. First, a gate pattern having a double layered structured is formed using a first mask (not shown), wherein the gate pattern includes a pixel electrode 118, a data pad 138, a gate electrode 108 connected to the gate line 102 and a gate line 102 on a lower substrate 142. The double layered structure includes first and second conductive layers 101, 103.

Specifically, the first and second conductive layers 101, 103 are formed on the lower substrate 102 using a deposition method such as sputtering. Then the first and second conductive layers 101, 103 are patterned using a first mask formed using a photolithography process and etching process, thereby forming the gate pattern illustrated in FIGS. 5A and 5B. The gate pattern includes the gate line 102, the gate electrode 108, the gate pad 128, the data pad 138, the pixel electrode 118. The first conductive layer 101 is a transparent conductive material such as ITO, TO, IZO, and the second conductive layer 103 is a metal material such as Mo, Ti, Cu, Al(Nd) and the like.

Figure 6B:
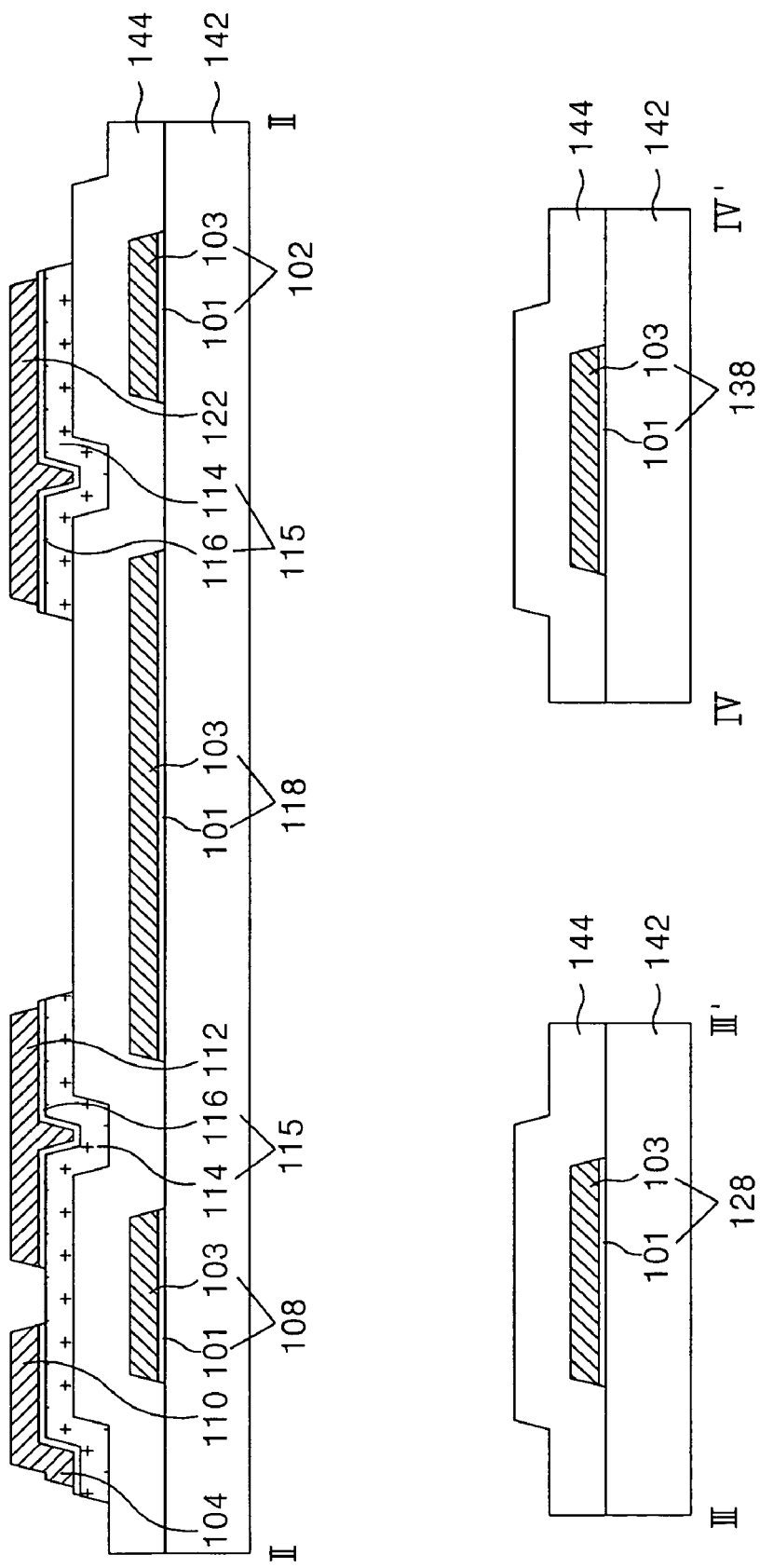

FIGS. 6A and 6B illustrate a plane view and a sectional diagram, respectively, of a second mask process according to an embodiment of the present invention. Referring to FIG. 6B, a gate insulating film 144 is formed on the lower substrate 142 where the gate pattern has been formed. Then, utilizing a second mask process, a source/drain pattern including a data line 104, a source electrode 110, a drain electrode 112, and a storage upper electrode 122, and a semiconductor pattern 115 including an active layer 114 and an ohmic contact layer 116 that overlap along the rear surface of the source/drain pattern are formed on top thereof. The semiconductor pattern 115 and the source/drain pattern are formed using a single mask process by utilizing a diffractive exposure mask.

Referring to FIG. 7A, first a gate insulating film 144, an amorphous silicon layer 105, an amorphous silicon layer 107 doped with impurities n+ or p+, and a source/drain metal layer 109 are sequentially formed on the lower substrate 142 over the gate pattern. For example, the gate insulating film 144, the amorphous silicon layer 105, the amorphous silicon layer 107 doped with impurities are formed using PECVD, and the source/drain metal layer 109 is formed using sputtering. The gate insulating film 144 is an inorganic insulating material such as silicon oxide SiOx, silicon nitride SiNx, and the source/drain metal layer 109 is Cr, Mo, MoW, Al/Cr, Cu, Al(Nd), Al/Mo, Al(Nd)/Al, Al(Nd)/Cr, Mo/Al(NdO/Mo, Cu/Mo, Ti/Al(Nd)/Ti or the like. When the double layered structure is Al/Cr, the Al layer is formed after the Cr layer.

A photo resist 219 is spread over the source/drain metal layer 109, and then exposed and developed using a diffractive exposure mask 210. The diffractive exposure mask 210 includes a transparent quartz substrate 212, a shielding layer 214 formed of a metal layer such as Cr on top thereof, and a diffractive exposure slit 216. The shielding layer 214 is located at an area where the semiconductor pattern and the source/drain pattern is to be formed. The diffractive exposure slit 216 is located at an area where the channel of the thin film transistor is to be formed. Accordingly, after development a photo resist pattern 220 having the stepped structure illustrated in FIG. 7B is formed.

Referring to FIG. 7B, the shielding layer 214 intercepts ultra violet rays during processing, thereby leaving a first resist pattern 220A. The diffractive exposure slit 216 diffracts the ultra-violet rays during processing thereby leaving a second photo resist pattern 220B that is thinner than the first photo resist pattern 220A.

Figure 7C:
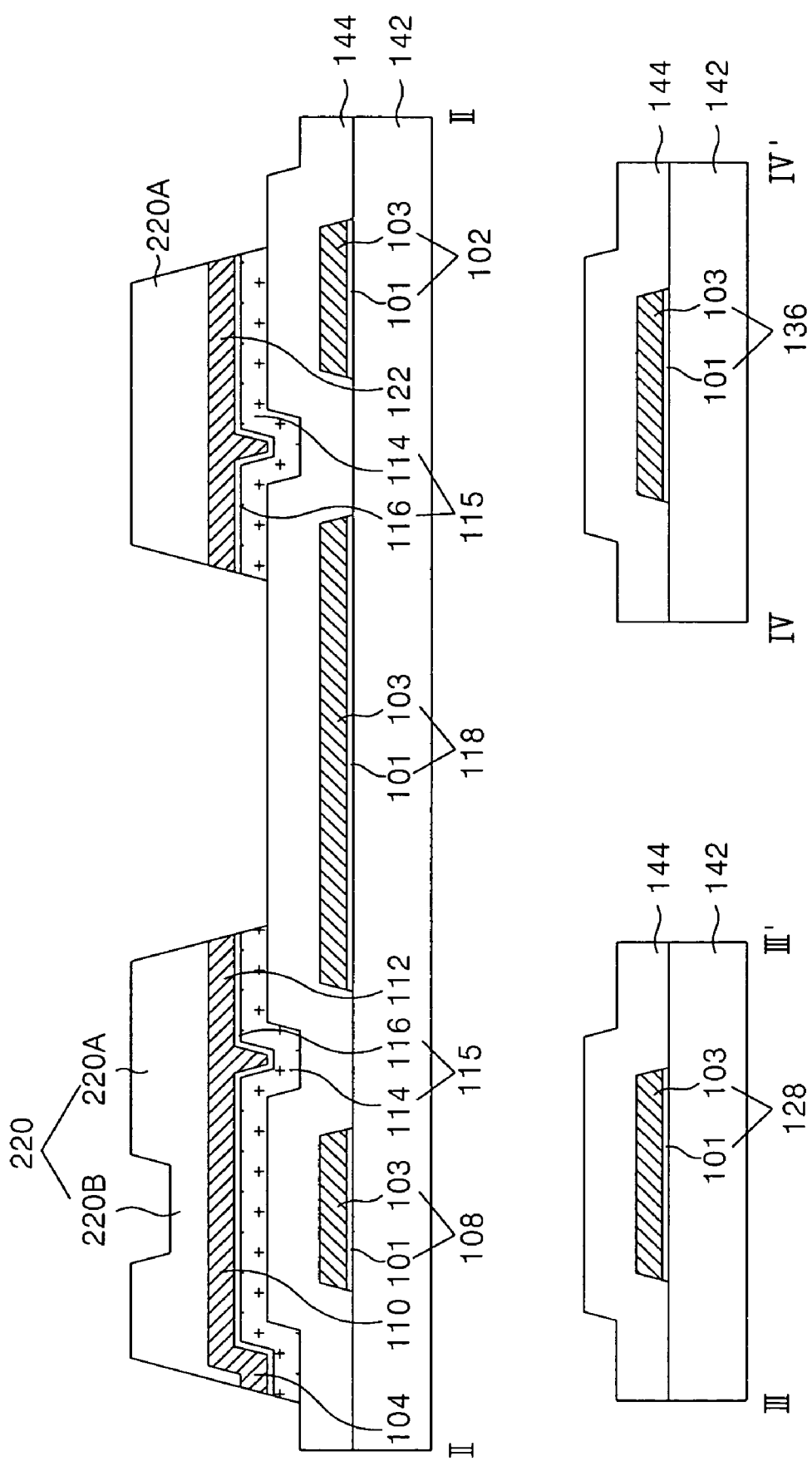

The source/drain metal layer 109 is then etched using the photo resist pattern 220 to form a source/drain pattern and the semiconductor pattern 115 as illustrated in FIG. 7C. At this point in the process, the source electrode 110 and the drain electrode 112 are integrated within the source/drain pattern i.e., there is not break between the source and drain electrode.

Next, the photo resist pattern 220 is ashed using oxygen O2 plasma. Because of the thickness of the first photo resist pattern 220A the layers under the first photo resist pattern remains unchanged, i.e., only the thickness of the photo resist is thinned. However, the layers under the second photo resist pattern 220B which was thinner, are removed during the etching process, thereby separating the source electrode 110 from the drain electrode 112 and exposing the active layer 114 as illustrated in FIG. 7D. Accordingly, a channel is formed in the active layer 114 between the source electrode 110 and the drain electrode 112. In addition, both sides of the source/drain pattern are etched once more along the ashed first photo resist pattern 220A, thus the source/drain pattern and the semiconductor pattern 115 have a fixed stepped difference in a step shape. The first photo resist pattern 220A remaining on the source/drain pattern is removed by a strip process as in FIG. 7E.

Figure 8B:
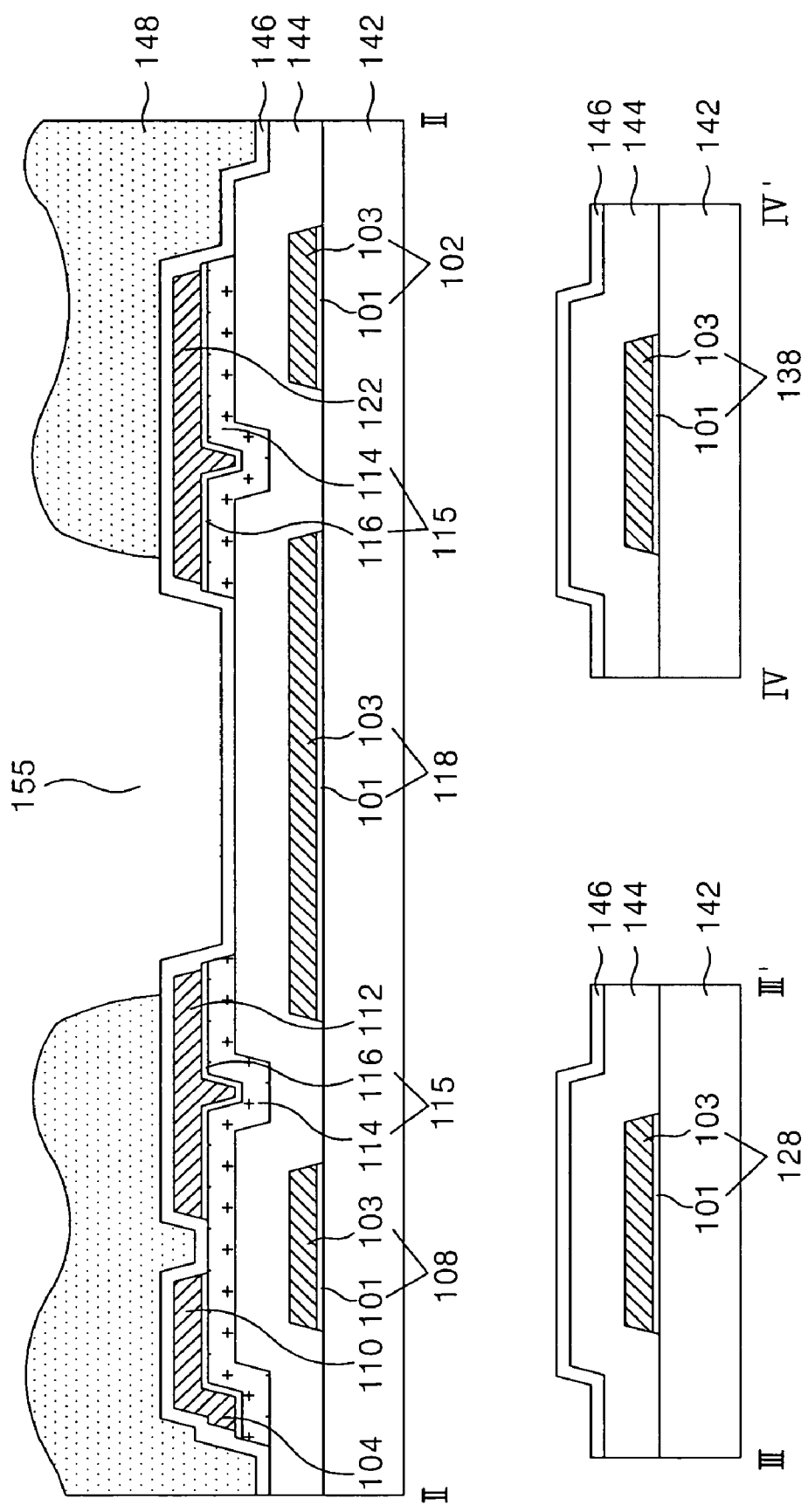

FIGS. 8A and 8B illustrate a plane view and a sectional diagram, respectively, of a third mask process utilized to fabricate a transflective thin film transistor substrate according to an embodiment of the present invention. Referring to FIGS. 8A and 8B, a first passivation film 146 is formed on the surface of the thin film transistor substrate including the area where the source/drain pattern is formed using for example, a deposition method such as sputtering. Then an organic film 148 is formed on top thereof using for example spin coating and is then patterned using a third mask process, such that the organic film 148 has an aperture part 155 in the transmissive area and an embossed surface in the reflective area.

The first passivation film 146 is an inorganic insulating material such as the gate insulating film 144 and the organic film 148 is a photosensitive organic material such as acrylic resin. The organic film 148 is patterned using the third mask such that the aperture part 155 penetrating the organic film 148 is formed in the transmissive area in correspondence with the transmissive part of the third mask, and the organic film 148 of the pad area where the gate pad 128 and the data pad 138 are formed is removed. Further, the remaining part except for the transmission part in the third mask has a structure that the shielding part and the diffractive exposure part (or transflective part) are repeated, in correspondence thereto, the organic film 148 is patterned to have a structure where the shielding area (projected part) and the diffractive exposure area (groove part) having the stepped difference are repeated in the reflective area. Subsequently, the organic film 148 with the repeated projected part and groove part is fired to form an embossed shape on the surface of the organic film 148 in the reflective area. On the other hand, the aperture part 155 of the organic film 148 has its edge part overlap the drain electrode 112 and the storage upper electrode 122, thereby making the edge part of the storage upper electrode 122 and the drain electrode 112 projected toward the aperture part 155.

Figure 9A:
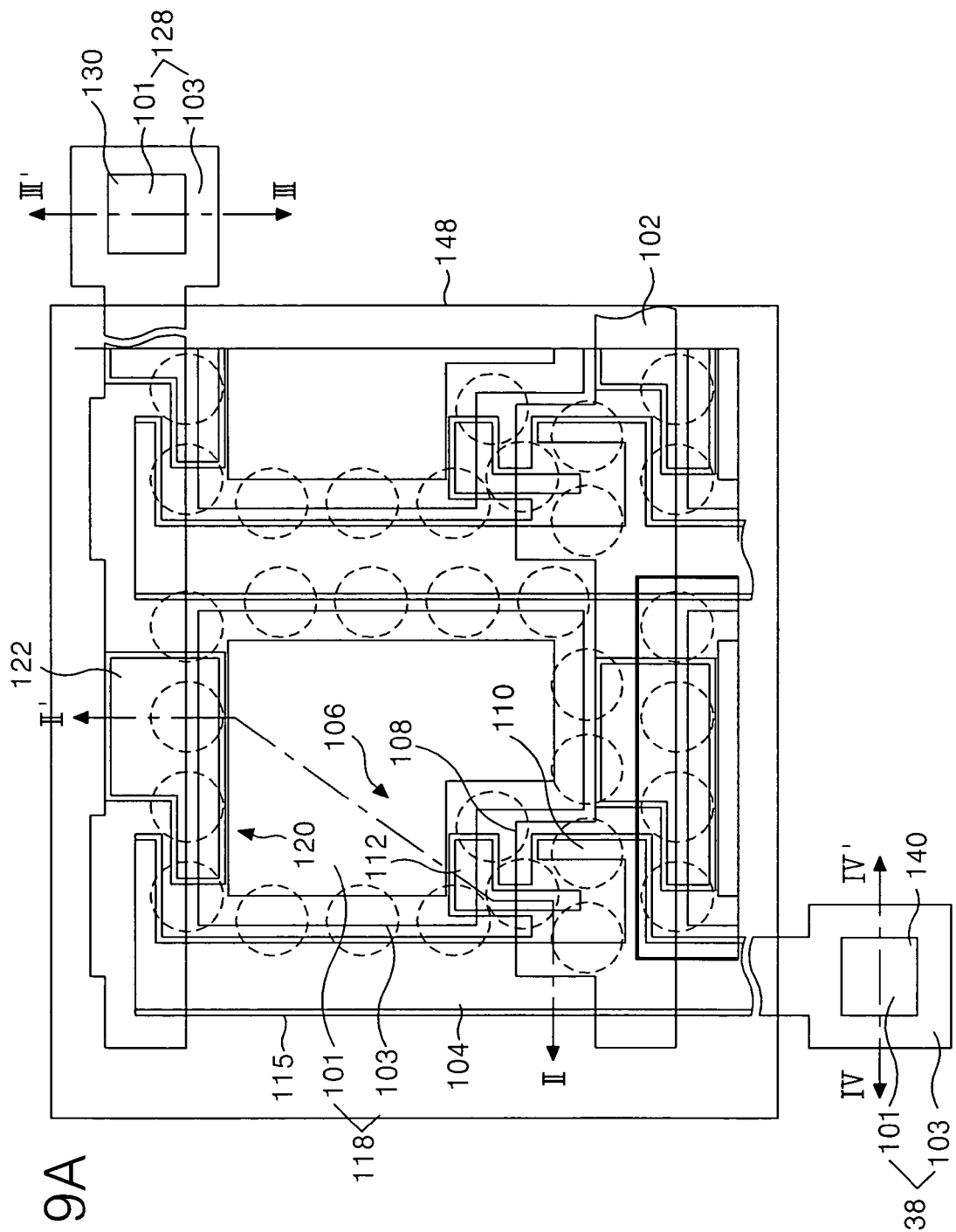
FIGS. 9A and 9B illustrate a plane view and a sectional diagram, respectively, of a fourth mask process according to an embodiment of the present invention.
Figure 9B:
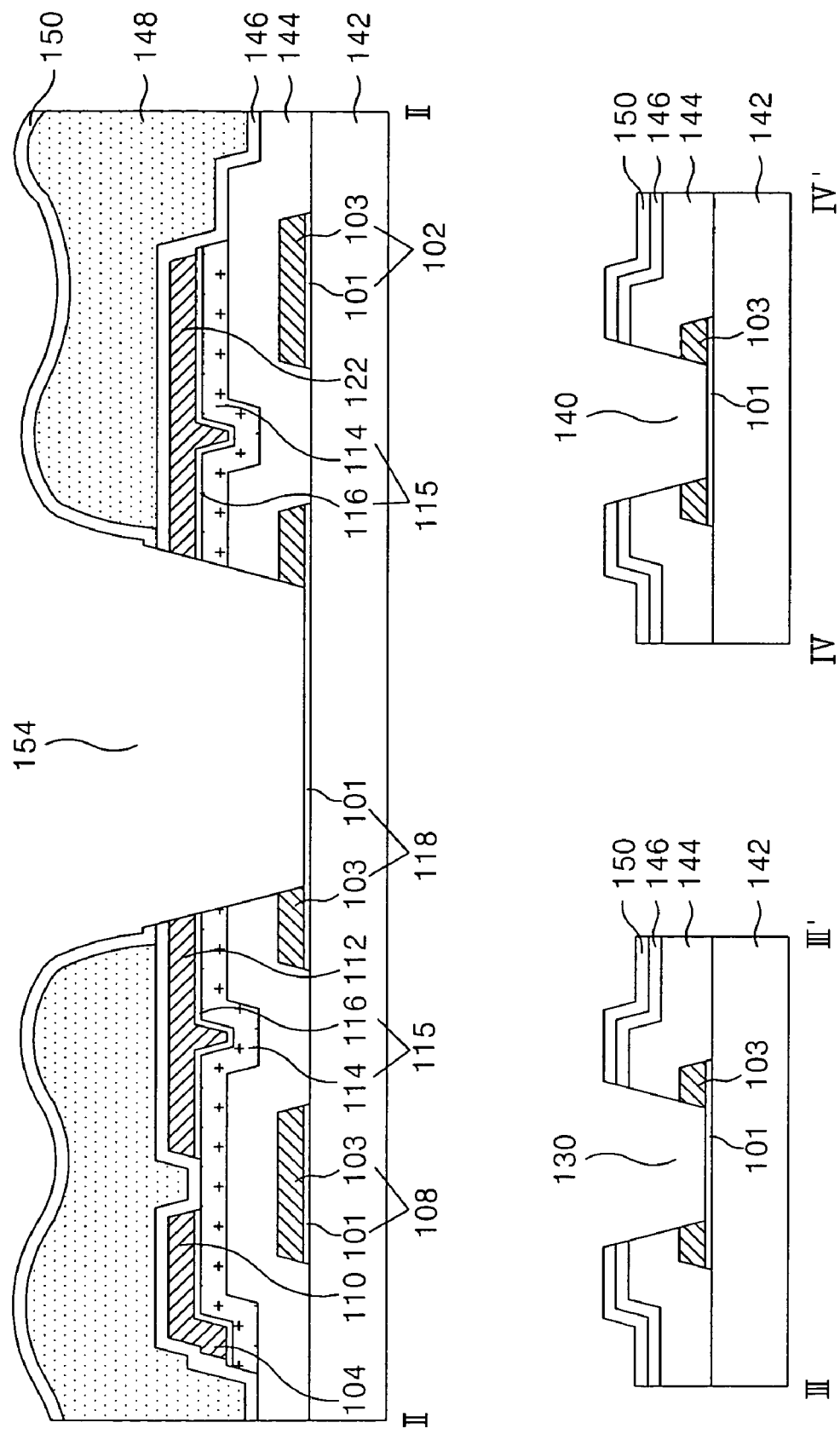

FIGS. 9A and 9B illustrate a plane view and a sectional diagram, respectively, of a fourth mask process utilized to fabricate a transflective thin film transistor substrate according to an embodiment of the present invention. Referring to FIG. 9B, a second passivation film 150 having an embossed shape is formed on the organic film 148 using the fourth mask process, and first and second contact holes 130, 140 and the transmission hole penetrating from the second passivation film 150 to the second conductive layer 103 of the gate pattern are formed.

Specifically, the second passivation film 150 is formed on the organic film 148 using a deposition method such as PECVD. The second passivation film 150 is of the same inorganic insulating material as the first passivation film 146. Subsequently, the transmission hole 154 is formed in the transmissive area of each pixel where the aperture part 155 of the organic film 148 is formed and first and second contact holes 130, 140 are formed at the pad areas. The transmission hole 154 penetrates the second passivation film 150, the first passivation film 146, the gate insulating film 144 and the second conductive layer 103 of the pixel electrode 118 in the aperture part 155 of the organic film 148. Accordingly, the first conductive layer 101 of the pixel electrode 118 is exposed through the transmission hole 154, and the second conductive layer 103 remains only at the border of the pixel electrode, where the first conductive layer 101 is unexposed. Further, the drain electrode 112 projected toward the aperture part 155 of the organic film 148 through the edge part of the transmission hole 154, and the edge part of the storage upper electrode 122 are exposed. The first and second contact holes 130, 140 penetrate from the second passivation film 150 to the second conductive layer 103 of the gate pad 128 and the data pad 138 on top of the gate pad 128, the data pad 138 respectively. Accordingly, the first conductive layer 101 of the gate pad 128 and the data pad 138 is exposed through each of the first and second contact holes 130, 140, and the second conductive layer 103 remains only at the border where the first conductive layer 101 is unexposed.

Figure 10A:
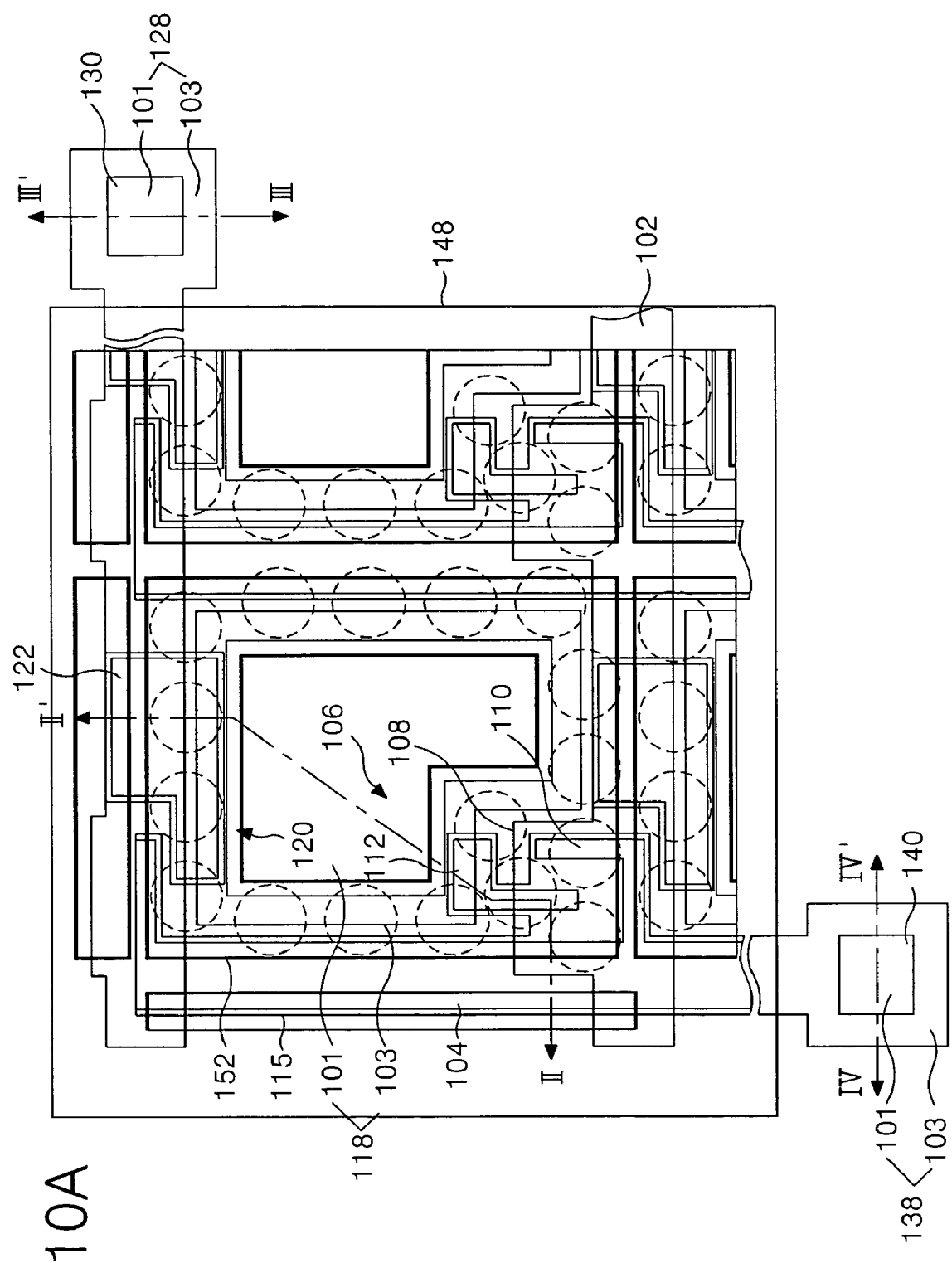
FIGS. 10A and 10B illustrate a plane view and a sectional diagram, respectively, of a fifth mask process according to an embodiment of the present invention.
Figure 10B:
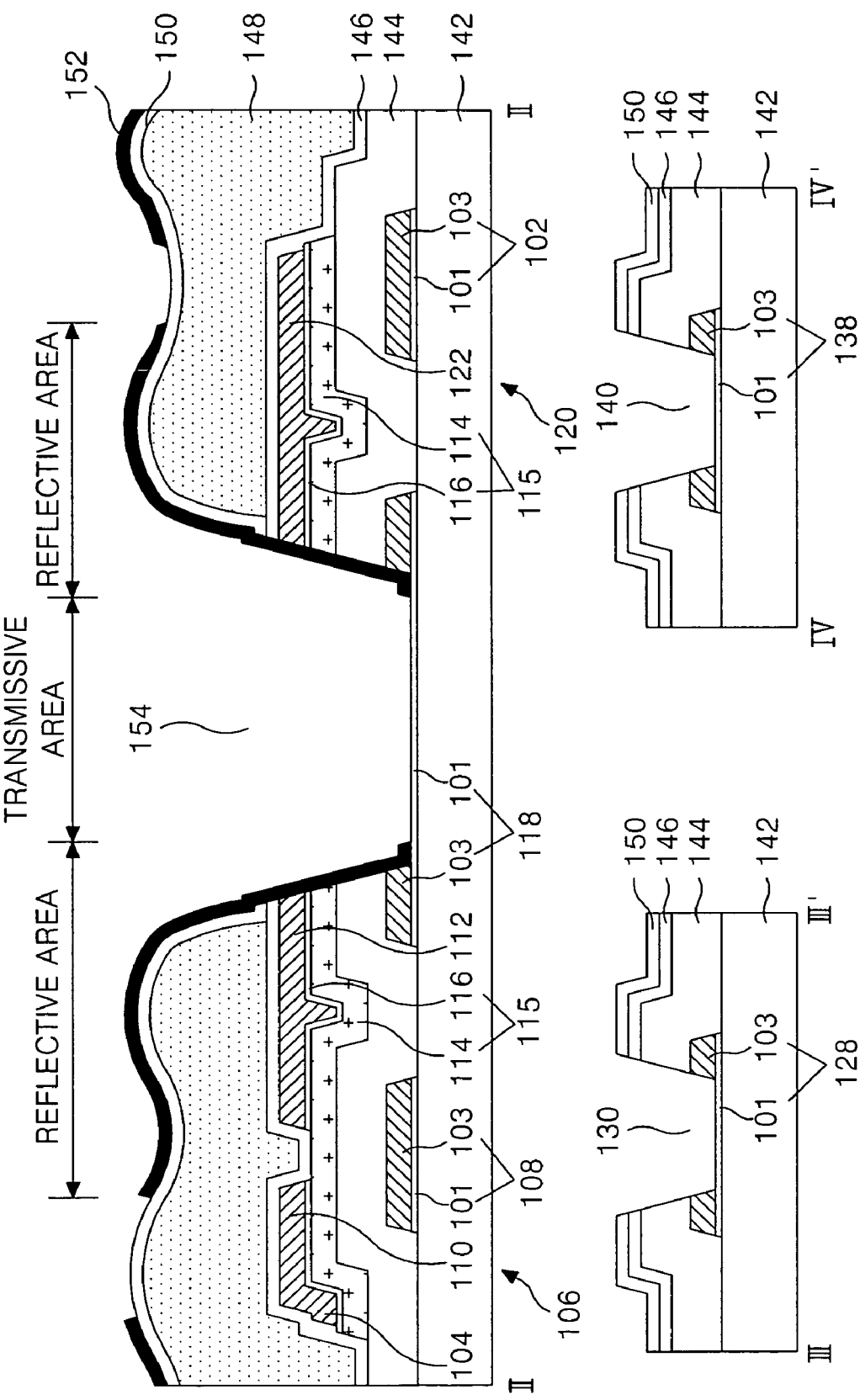

FIGS. 10A and 10B illustrate a plane view and a sectional diagram, respectively, of a fifth mask process utilized to fabricate a transflective thin film transistor substrate according to an embodiment of the present invention. Referring to FIG.

10B, a reflective metal layer is formed on the second passivation film 150 maintaining the embossed shape. The reflective metal layer is a metal that has high reflectivity, for example, AlNd. There after, the reflective metal layer is patterned by the photolithography process using the fifth mask and an etching process, thereby forming the reflective electrode 152 in the reflective area of each pixel. The reflective electrode 152 connects the drain electrode 112 with the pixel electrode 118 through the edge part of the transmission hole 154, and connects the storage upper electrode 122 with the pixel electrode 118. Accordingly, no separate contact hole is required for connecting the pixel electrode 122 with the drain electrode 112 and the storage upper electrode 122, thus the aperture ratio of the transmissive area is increased. Furthermore, the reflective electrode 152 is connected to the first conductive layer 101 of the pixel electrode 118 and to the edge part of the second conductive layer 103 Mo exposed through the edge part of the transmission hole 154, thus the contact resistance of the reflective electrode 152 AlNd and the first conductive layer 101 ITO is reduced.

The transflective thin film transistor substrate according to the present invention connects the pixel electrode 118 with the drain electrode 112 and the storage upper electrode 122 using of the reflective electrode 152, and reduces the fabrication process to a five mask process. In contrast to the related art which requires a six mask process.

Figure 11:
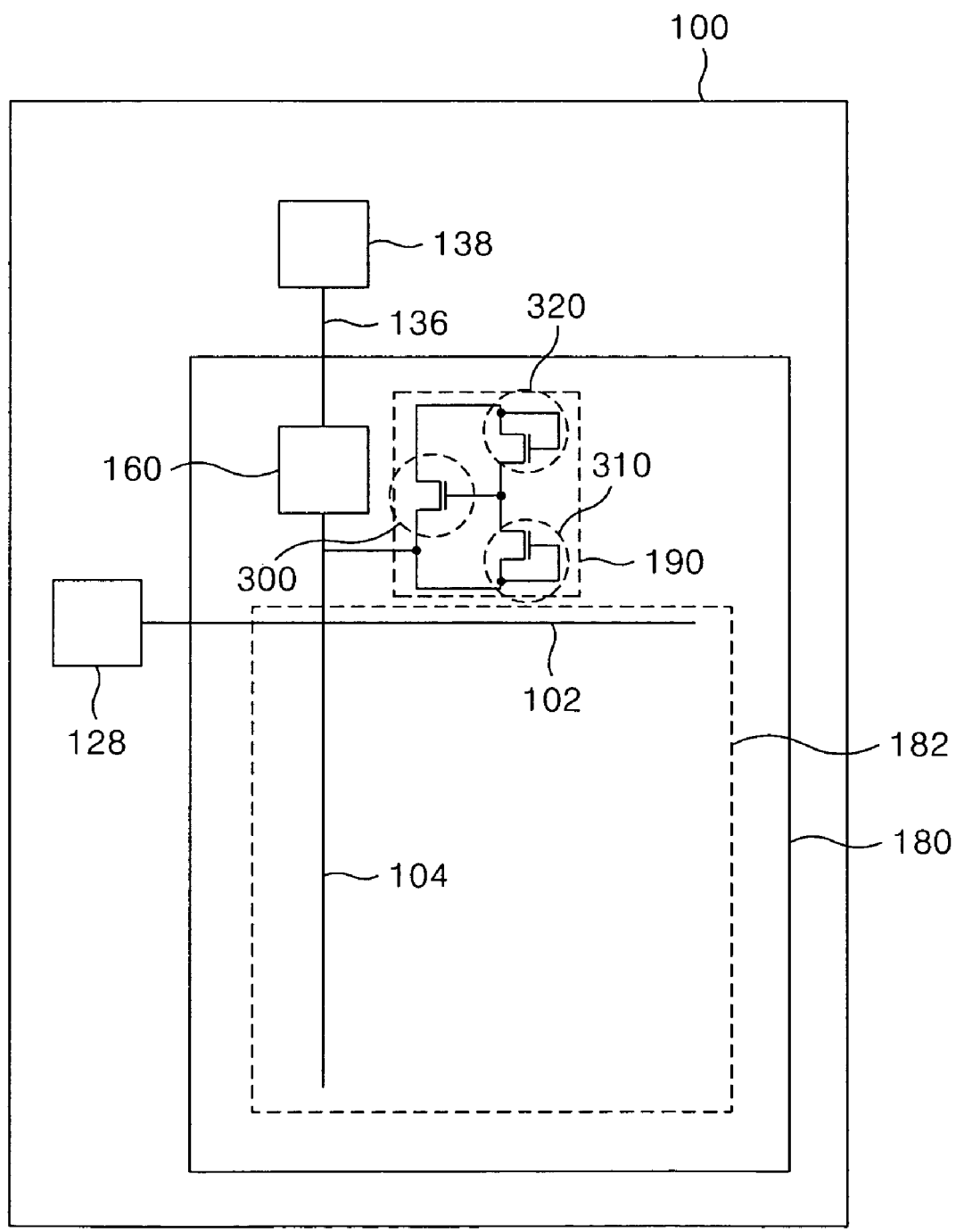
FIG. 11 is a plane view illustrating the transflective thin film transistor substrate according to the present invention, with a surrounding part centered.

FIG. 11 illustrates the ambient part of the transflective thin film transistor substrate according to an embodiment of the present invention.

The transflective thin film transistor substrate 100 shown in FIG. 11 includes a contact electrode 160 in order to connect the data pad 138 formed in the same layer as the gate pad 128 with the data line 104. In other words, the contact electrode 160 connects a data link 136 extended from the data pad 138 with the data line 104. Herein, the contact electrode 160 is formed of the same metal layer AlNd, AlNd/Mo as the reflective electrode 152 that is formed at the active area. The contact electrode 160 has a problem that it is corroded by oxidization when it is exposed to the outside, thus it is located at an area which is sealed by a sealant 180, i.e., between the sealant 180 and an active area 182.

Further, the thin film transistor substrate 100 includes a electrostatic discharging device 190 for intercepting static electricity flowing into the active area 182. The electrostatic discharging device 190 is connected to the data line 104 or the gate line 102, and composed of a plurality of thin film transistors 300, 310, 320 having a reciprocal connection relationship. The electrostatic discharging device 190 causes any over current to be discharged by having low impedance at a high voltage area by the static electricity, thereby intercepting the static electricity inflow. It does not affect a drive signal supplied through the gate line 102 or the data line 104 by having high impedance furing a normal drive environment. The electrostatic discharging device 190 requires a plurality of contact electrodes for reciprocally connecting the thin film transistors 300, 310, 320. The contact electrodes are also formed of the same metal layer AlNd, AlNd/Mo as the reflective electrode 152. Accordingly, the electrostatic discharging device 190 is also formed at the area sealed by the sealant 180, i.e., between the sealant 180 and the active area 182.

Figure 12:
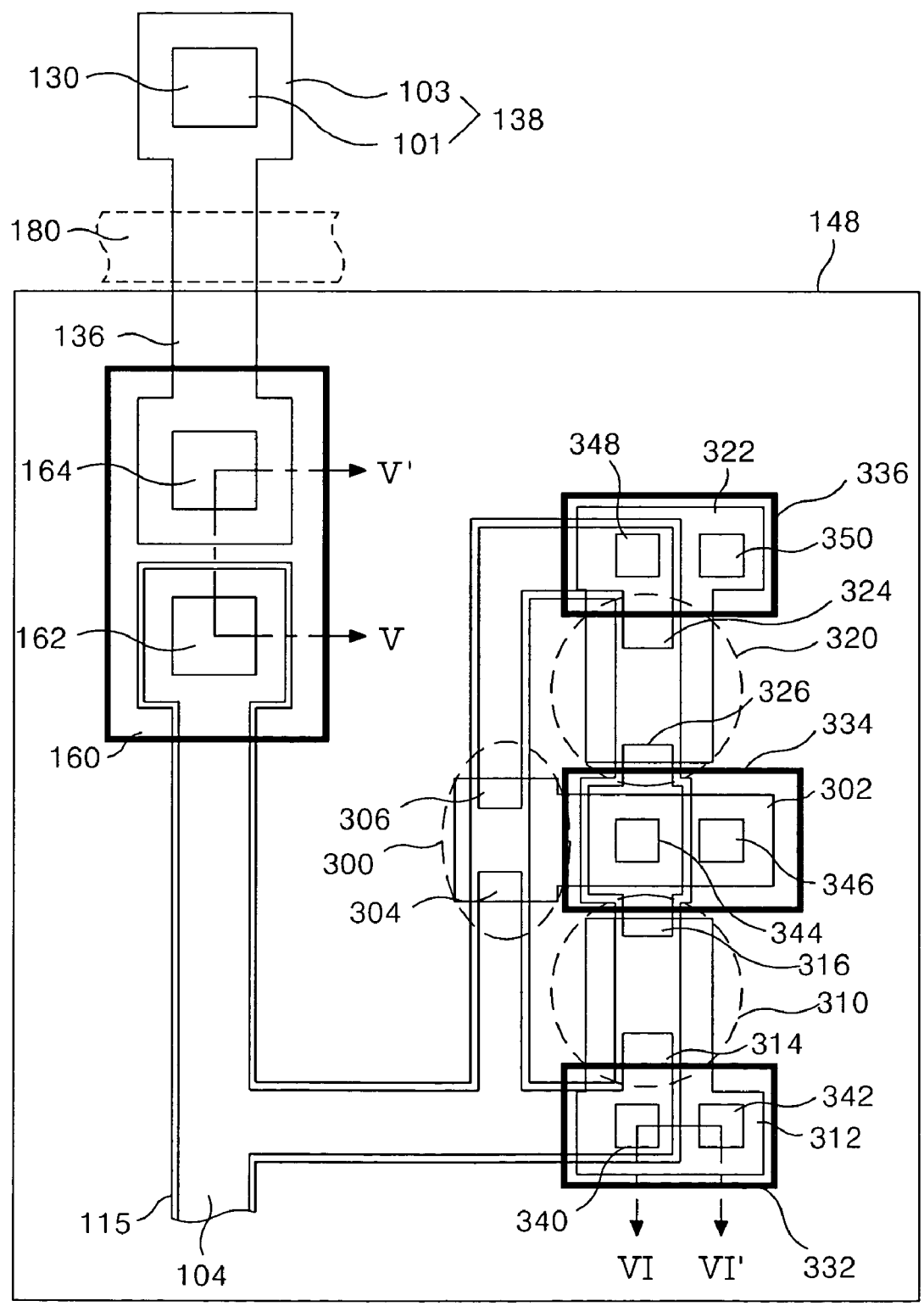
FIG. 12 is a plane view illustrating a static electricity prevention device area and a contact area of a data link and a data line shown in FIG. 11.

FIG. 12 is a plane view illustrating the electrostatic discharging device 190 and the contact electrode 160 connected to the data line 104 shown in FIG. 11. Referring to FIG. 12, the data line 104 is connected to a data link 136 extended from the data pad 138 through a first contact electrode 160 in an area which is to be sealed by the sealant 180. The data link 136 has a double structure including first and second conductive layers 101, 103 formed like the data pad 138 (discussed above). The first contact electrode 160 is connected to the data line 104 side by side through a third contact hole 162 that penetrates from the second passivation film 150 to the data line 104 and the semiconductor pattern 115. Further, the contact electrode 160 is connected to the data link 136 through a fourth contact hole 164 that penetrates from the second passivation film 150 to the second conductive layer 103 of the data link 136, as illustrated in FIG. 13.

The electrostatic discharging device connected to the data line 104 includes thin film transistors 300, 310, 320. The second thin film transistor 300 includes a second source electrode 304 connected to the data line 104, a second drain electrode opposite the second source electrode 304, and a second gate electrode 302 having a double layered structure overlapping the second source and drain electrodes 304, 306 with the semiconductor pattern 115 and the gate insulating film 144 there between. The double structure of the second gate electrode 302 includes first and second conductive layers 101, 103.

The third thin film transistor 310 is connected to the second source electrode 304 and the second gate electrode 302 of the second thin film transistor in a diode form. The third thin film transistor 310 includes a third source electrode 314 connected to the second source electrode 304, a third drain electrode 316 opposite the third source electrode 314, and a third gate electrode 312 overlapping the third source and drain electrodes 314, 316 with the semiconductor pattern 115 and the gate insulating film 144 there between. The third gate electrode 312, like the second, has a double layered structure including first and second conductive layers 101, 103. The third gate electrode 312 is also connected to the third source electrode 314 through the second contact electrode 332. In other words, the third contact electrode 332 is formed to lay from a fifth contact hole 340 that penetrates from the second passivation film 150 to the third drain electrode 316 and the semiconductor pattern 115, and a sixth contact hole that penetrates from the second passivation film 150 to the second conductive layer 103 of the third gate electrode 312, thereby connecting the third drain electrode 316 with the third gate electrode 312.

The fourth thin film transistor 320 is connected to the second drain electrode 306 and the second gate electrode 302 of the second thin film transistor in a diode form. The fourth thin film transistor 320 includes a fourth source electrode 324 connected to the second drain electrode 306, a fourth drain electrode 326 opposite the fourth source electrode 324, and a fourth gate electrode 322 overlapping the fourth source and drain electrodes 324, 326 with the semiconductor pattern 115 and the gate insulating film 144 there between. The fourth gate electrode 322 has a double layered structure including first and second conductive layers 101, 103. The fourth drain electrode 326 is also connected to the third drain electrode 316, and it is connected to the second gate electrode 302 through the third contact electrode 334 which is formed to lay over a seventh contact hole 344 and an eighth contact hole 346. Further, the fourth gate electrode 332 is connected to the fourth source electrode 324 through the fourth contact electrode 336 which is formed to lay over a ninth contact hole 348 and a tenth contact hole 350.

The first to fourth contact electrodes 160, 332, 334, 336 are formed of the same metal layer as the reflective electrode 152 as described above.

The transflective thin film transistor substrate having such a structure is formed using five mask processes as described above. This will be explained with reference to FIGS. 14A to 18B.

Figure 14A:
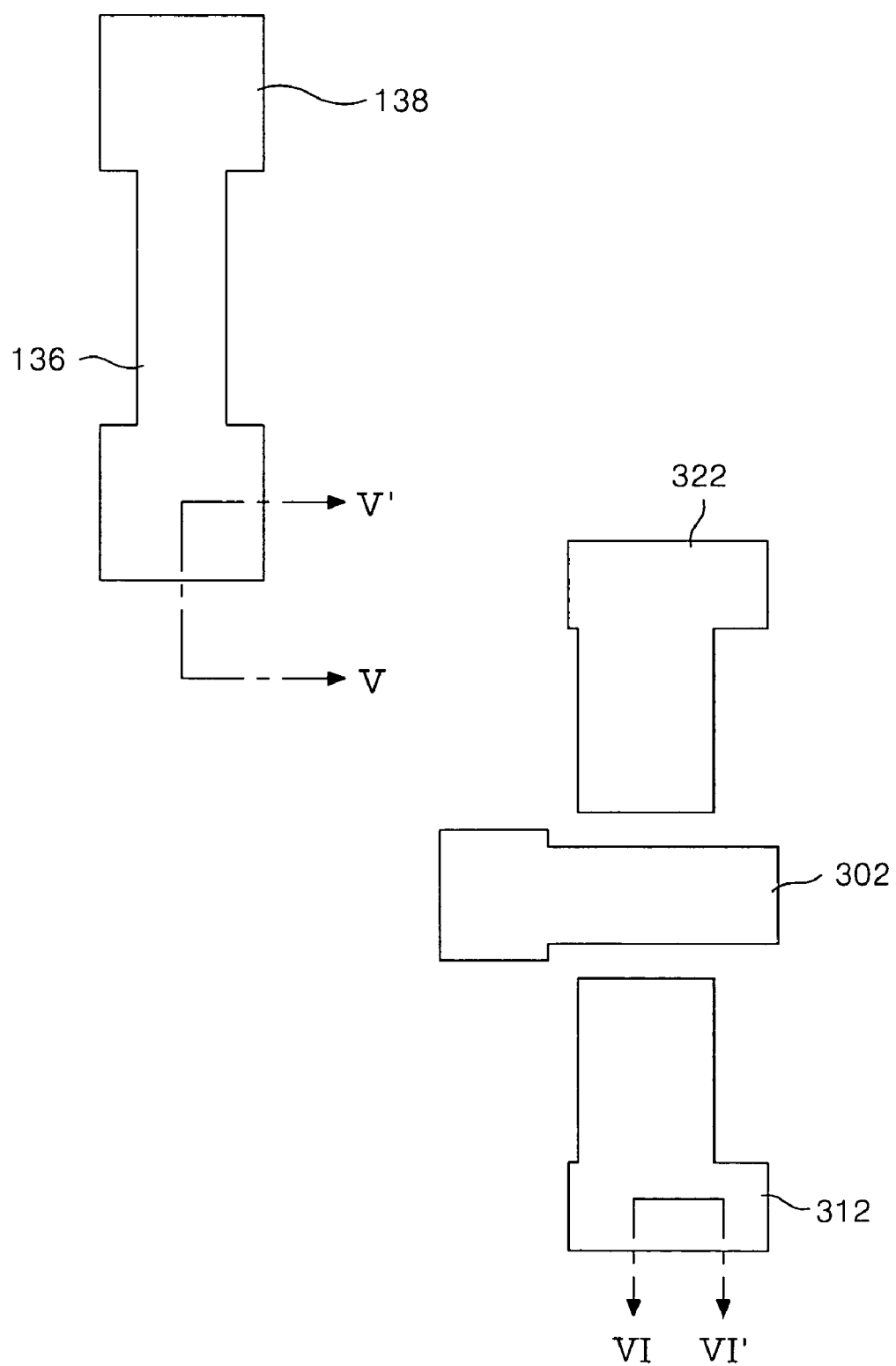
FIGS. 14A and 14B illustrate a plane view and a sectional diagram, respectively, of a first mask process according to another embodiment of the invention.
Figure 14B:
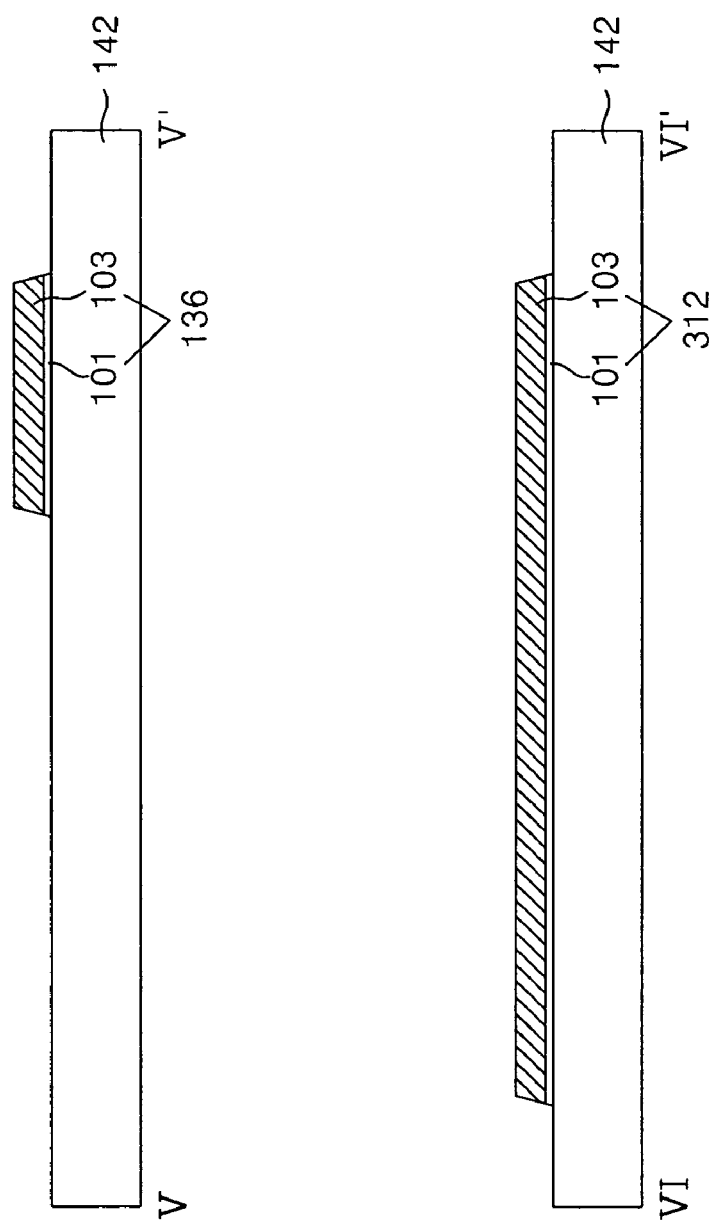

Referring to FIGS. 14A and 14B, a gate pattern is formed on the lower substrate 142 by a first mask process, wherein the gate pattern includes the data link 136 along with the data pad 138, and the second to fourth gate electrodes 302, 312, 322. The first mask process is the same as described in FIGS. 5A and 5B.

Figure 15A:
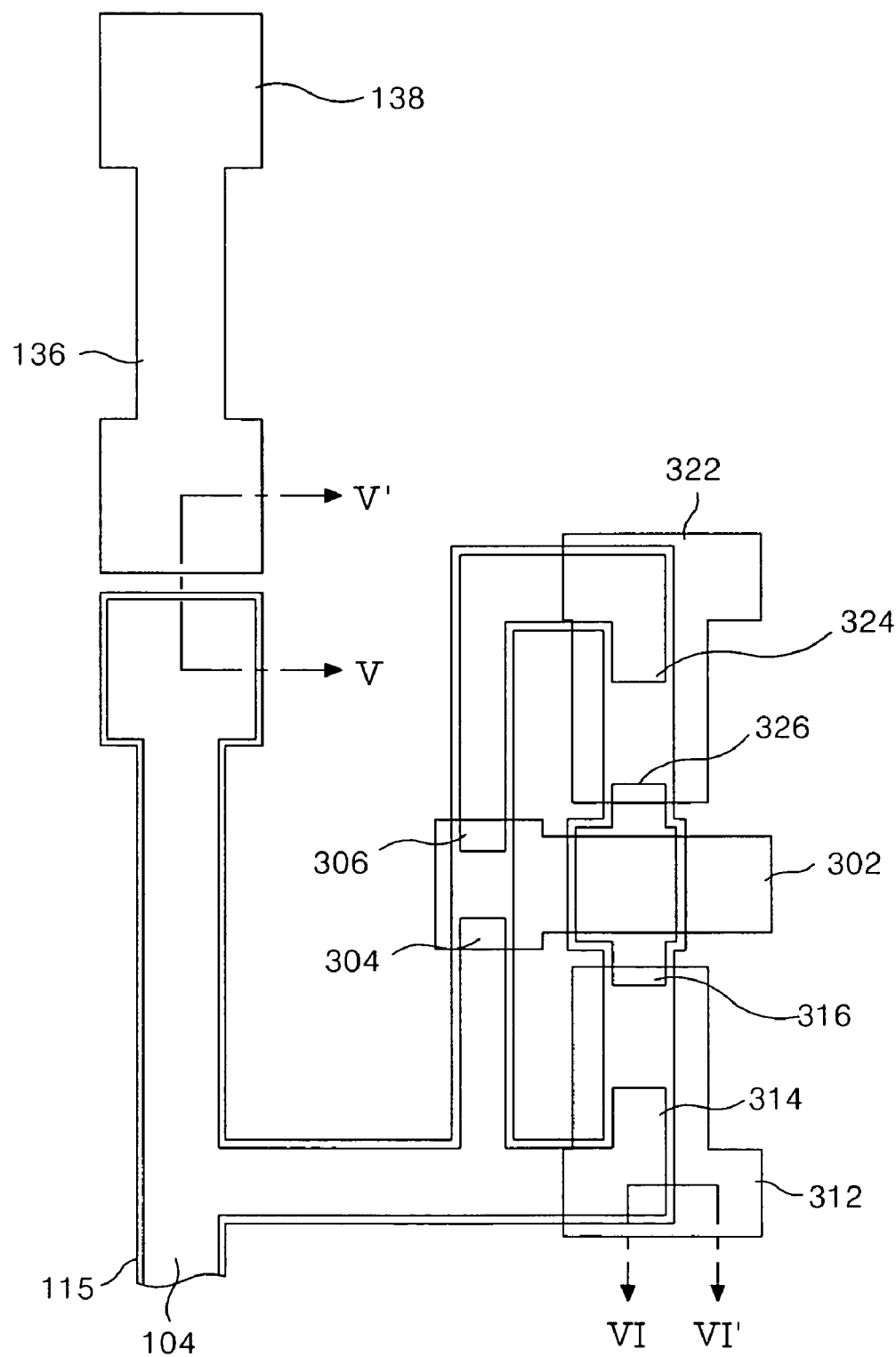

Then as illustrated in FIGS. 15A and 15B, a gate insulating film 144, a semiconductor pattern 115 including an active layer 114 and an ohmic contact layer 116, and a source/drain pattern including a data line 104, second to fourth source electrodes 304, 314, 324, second to fourth drain electrodes 306, 316, 326 are formed using a second mask process. The second mask process is the same as described in FIGS. 6A and 7E.

Figure 16A:
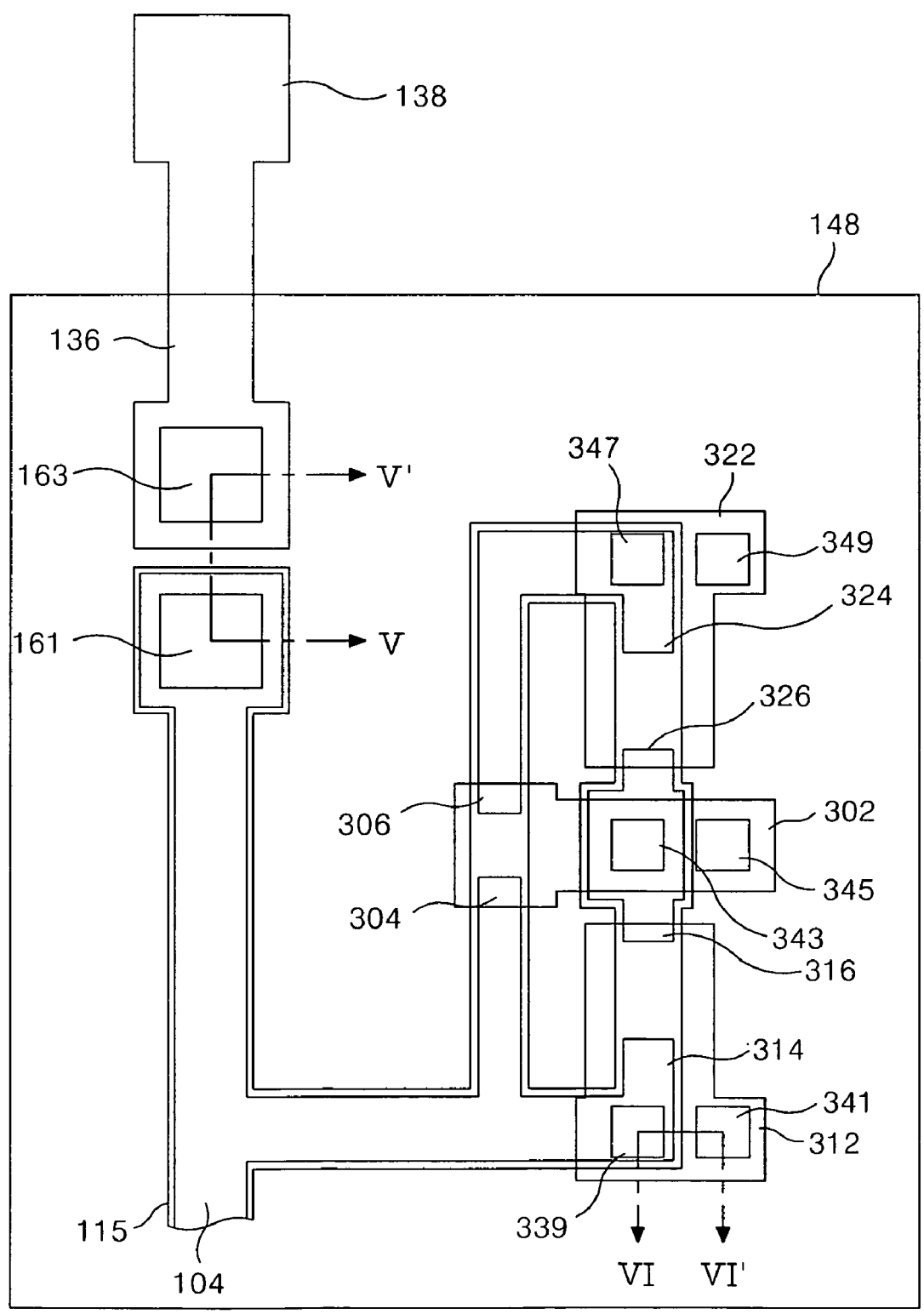

A first passivation film 146 and an organic film 148 on top thereof, are then formed, and the organic film 148 is patterned using a third mask process. As illustrated in FIG. 16B, the organic film 148 has third to tenth aperture parts 161, 163, 339, 341, 343, 345, 347, 349. The third mask process is the same as described in FIGS. 8A and 8B. In this case, the organic film is removed in the pad area and does not have the embossed surface at an area where the reflective electrode 152 is not formed, e.g., the pixel area.

Figure 17A:
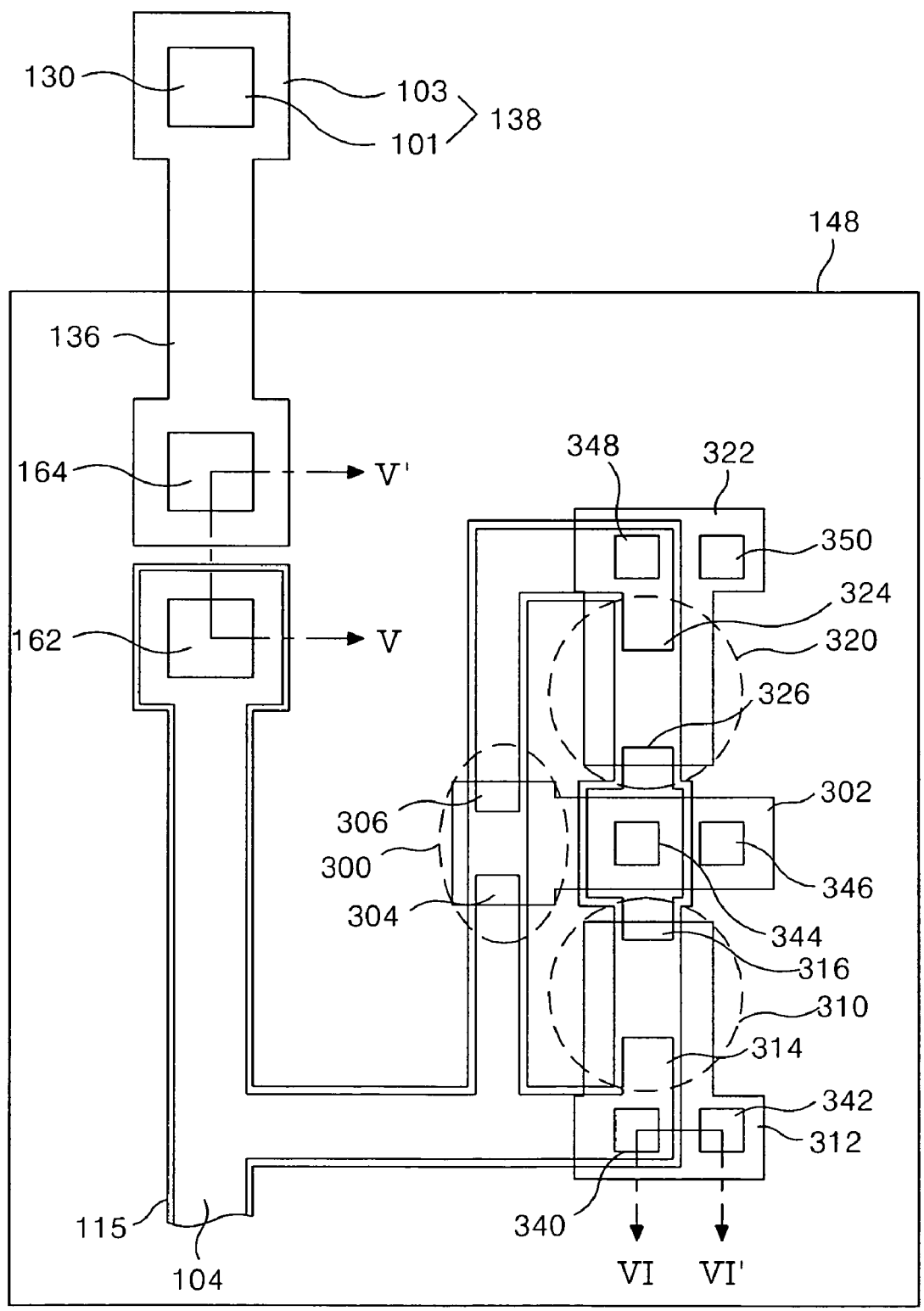
FIGS. 17A and 17B illustrate a plane view and a sectional diagram, respectively, of a fourth mask process according to the other embodiment of the invention.
Figure 17B:
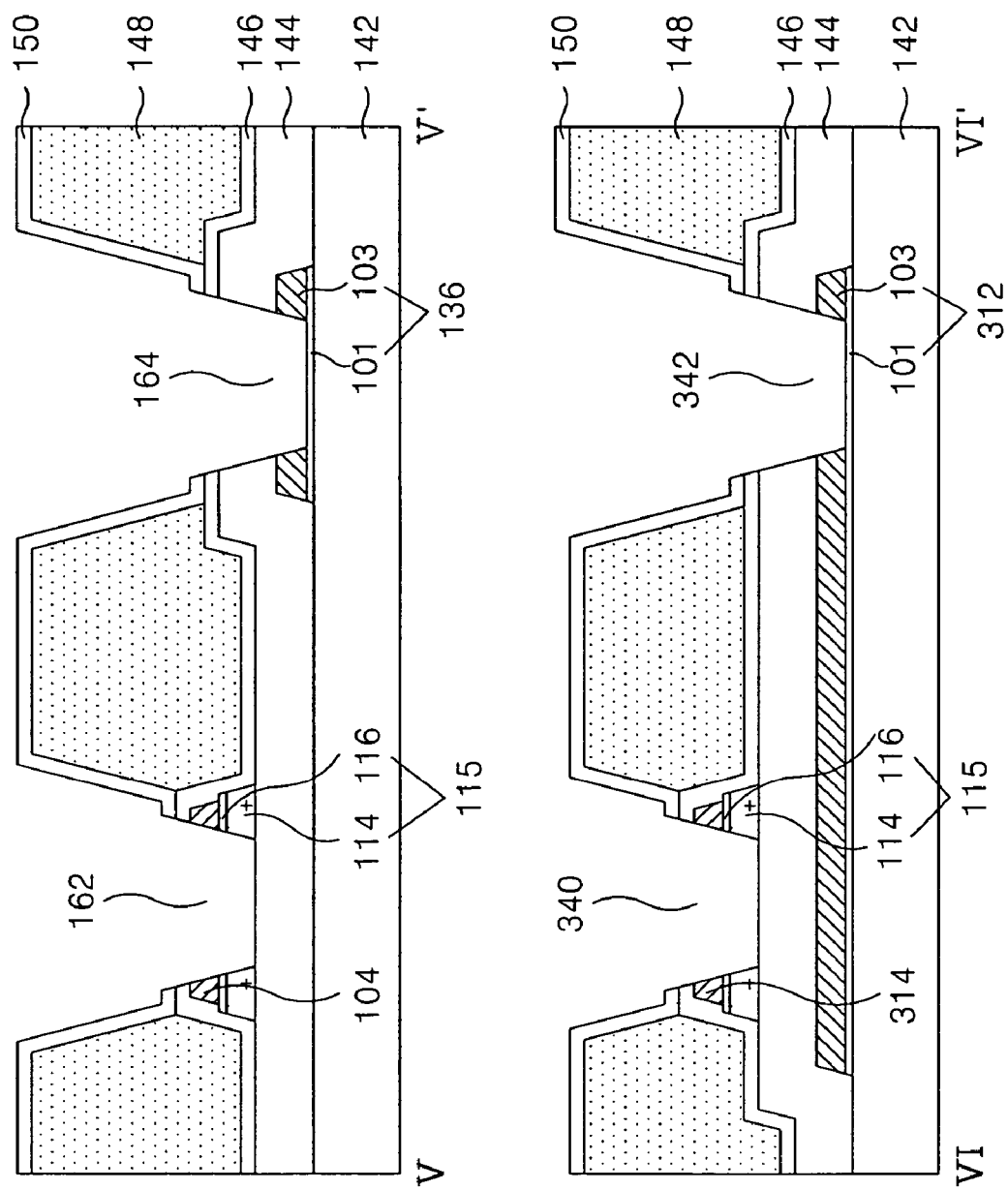

Referring to FIGS. 17A and 17B, a second passivation film 150 is formed using a fourth mask process, and third to tenth contact holes 162, 164, 340, 342, 344, 346, 348, 350 are formed to overlap the third to tenth aperture parts 161, 163, 339, 341, 343, 345, 347, 349 of the organic film 148. The fourth mask process is the same as described in FIGS. 9A and 9B.

Figure 18A:
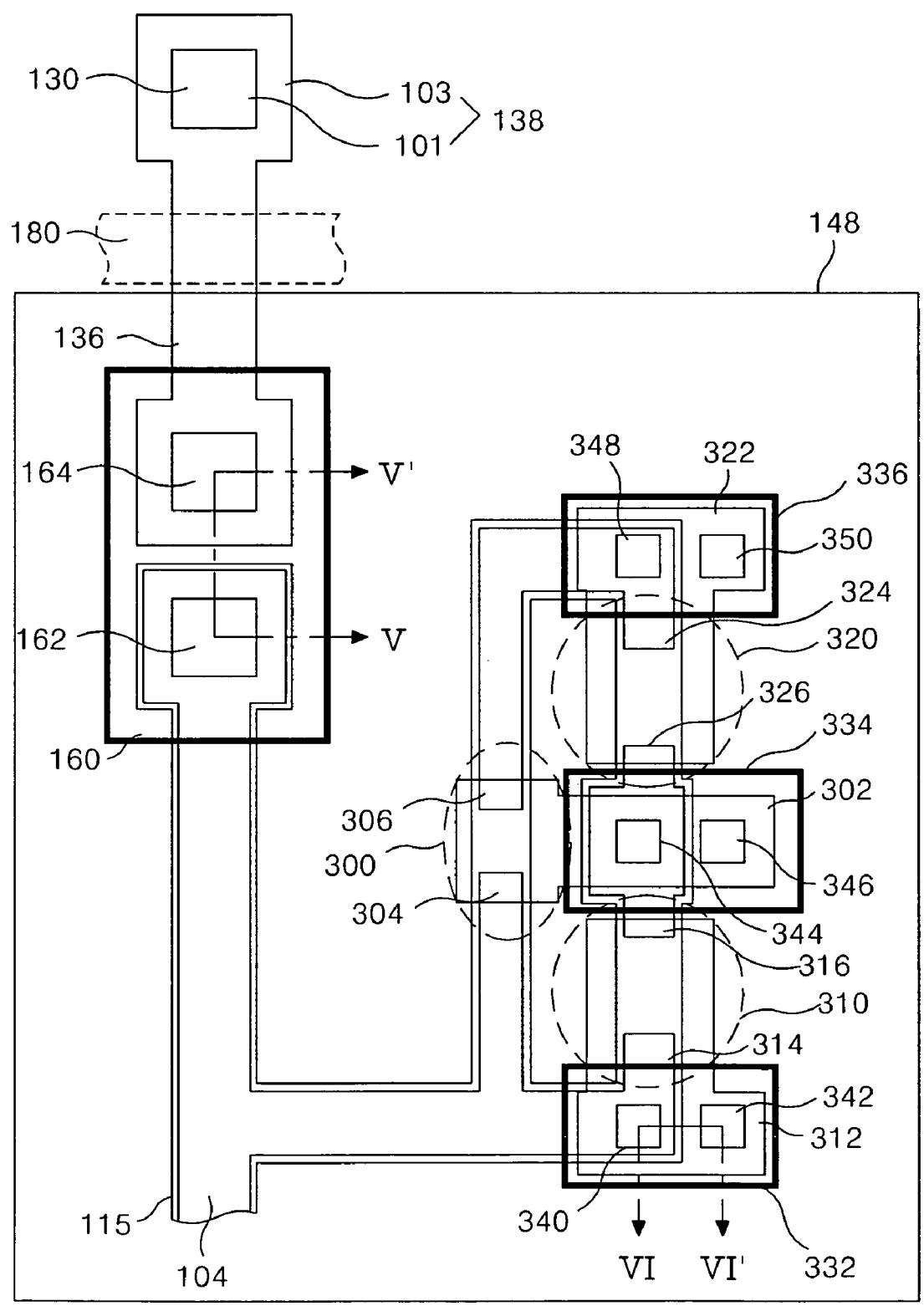

Referring to FIGS. 18A and 18B, first to fourth contact electrodes 160, 332, 334, 336 are formed of the same metal as the foregoing reflective electrode 152 using a fifth mask process. The fifth mask process is the same as described in FIGS. 10A and 10B.

Figure 19:
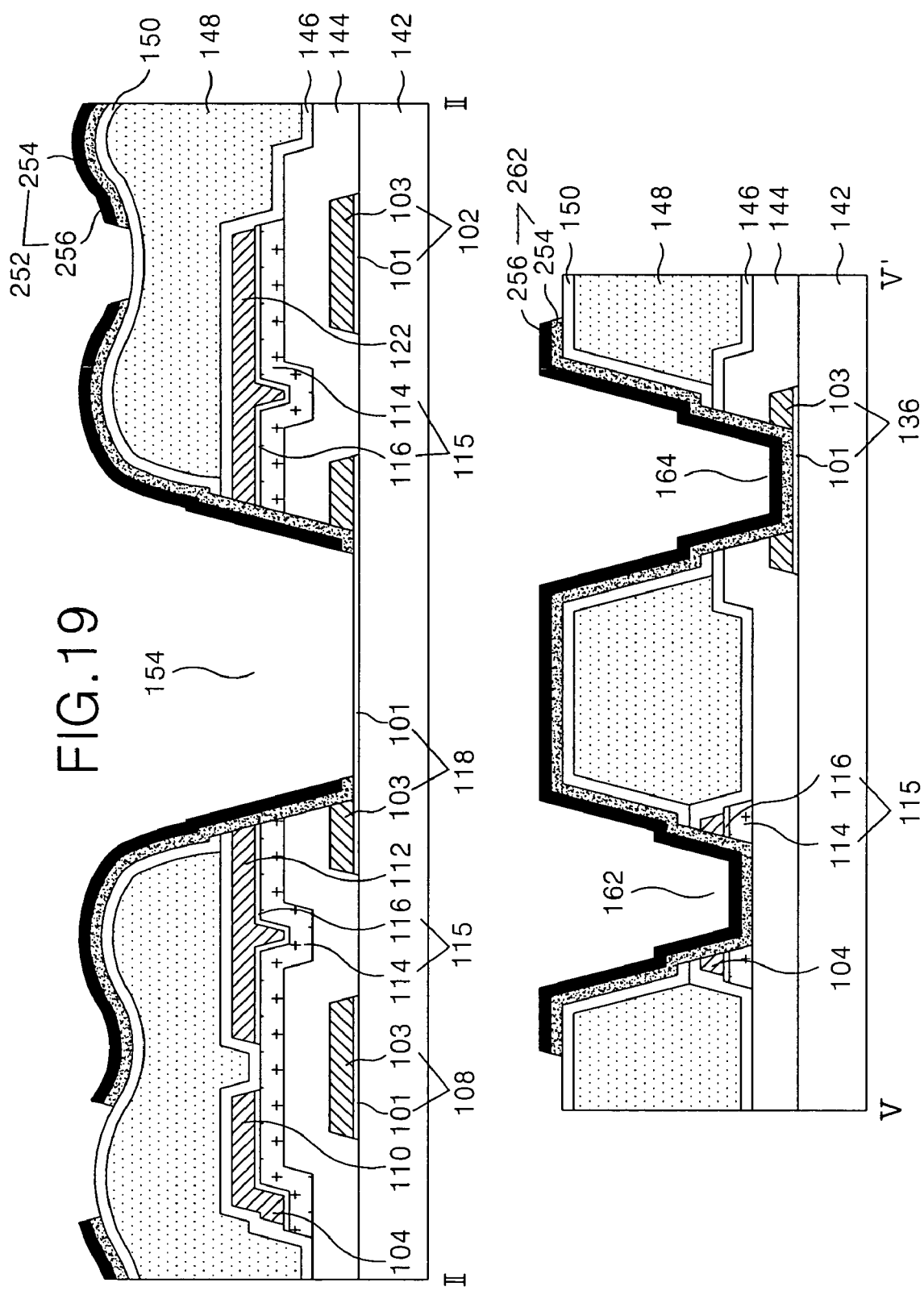
FIG. 19 is a sectional diagram illustrating the thin film transistor substrate according to another embodiment of the present invention.

FIG. 19 is a sectional diagram illustrating a pixel area along the line 11-11' and a contact area of a data link 136 and a data line 104 along the line V-V' in a transflective thin film transistor substrate according to the second embodiment of the present invention.

The transflective thin film transistor substrate shown in FIG. 19 includes the same components as the transflective thin film transistor substrate shown in FIGS. 4 and 13 except that the reflective electrode 252 and the first contact electrode 262 are formed in a double structure of the first and second conductive layers 254, 256. Accordingly, explanation for the repeated components is to be omitted.

The first conductive layer 254 in the reflective electrode 252 and the first contact electrode 262 illustrated in FIG. 19 is the transparent first conductive layer 101 of the data link 136 and the pixel electrode 118, which has low contact resistance, such as Mo. And the second conductive layer 256 is of a metal which has high reflexibility such as AlNd. Accordingly, the second conductive layer 256 AlNd of the first contact electrode 262 and the reflective electrode 252 are directly connected to the first conductive layer 101 ITO of the data link 136 and the pixel electrode 118, thus generation of an Al2O3 layer is prevented. Accordingly, the contact resistance of the reflective electrode 252 and the pixel electrode 118, and the contact resistance of the first contact electrode 160 and the data link 136 are reduced.

FIG. 20 is a sectional diagram illustrating a pixel area along the line II-II' and a contact area of a data link 136 and a data line 104 along the line V-V' in a transflective thin film transistor substrate according to a third embodiment of the present invention.

The transflective thin film transistor substrate shown in FIG. 20 includes the same components as the transflective thin film transistor substrate shown in FIGS. 4 and 13 except that the second passivation film 150 on the organic film 148 is removed. Accordingly, explanation for the repeated components is to be omitted.

The second passivation film 150 illustrated in FIGS. 4 and 13 reinforces the adhesive strength of the organic film 148 and the reflective electrode 152, but can be omitted. Referring to FIG. 20, the second passivation film 150 is omitted, the transmission hole 154 and the first to fourth contact holes 130, 140, 162, 164 are formed in the first passivation film 146 process before the organic film 148 is formed. The fabricating method of the transflective thin film transistor substrate with such a structure is as follows.

Figure 21A:
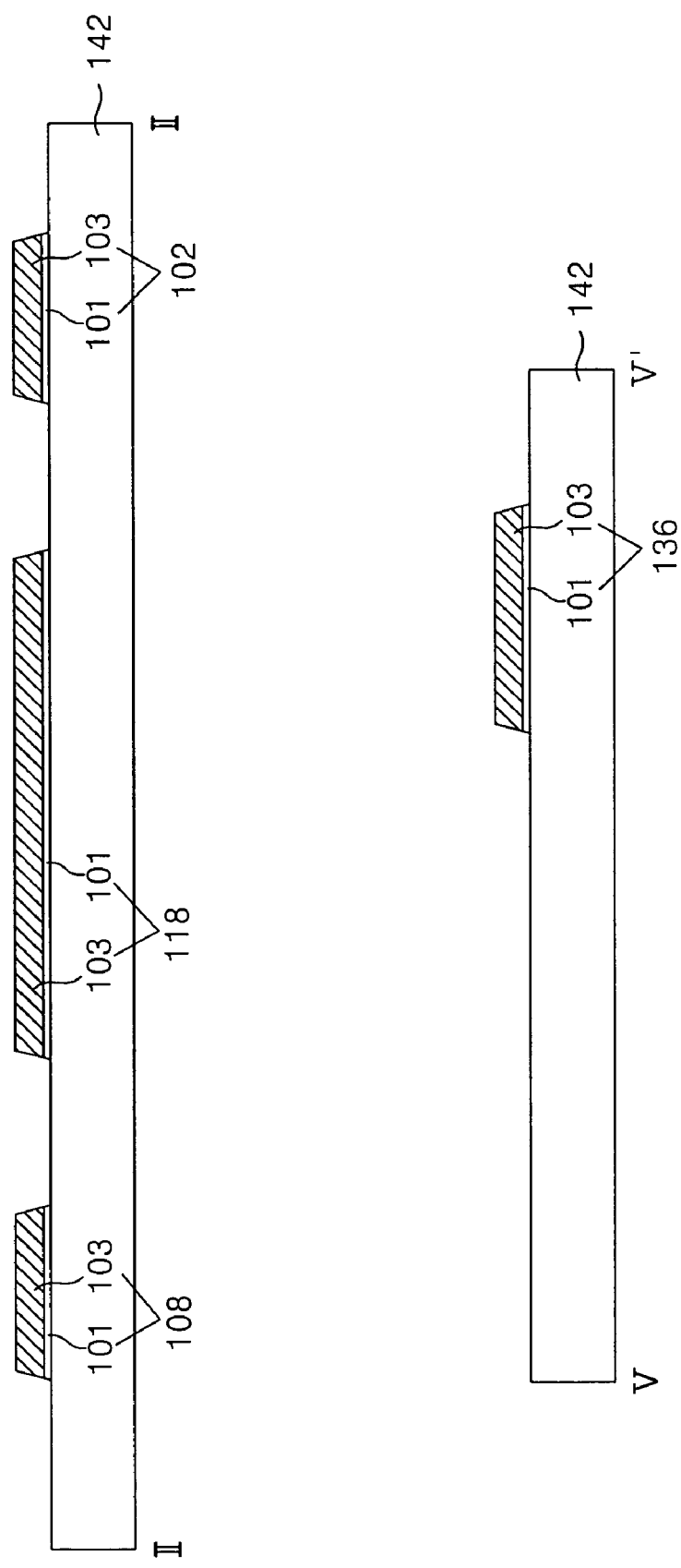

FIGS. 21A to 21E are sectional diagrams illustrating a method of fabricating a transflective thin film transistor substrate shown in FIG. 20. Referring to FIG. 21A, first a gate pattern, which includes a gate line 102, a gate electrode 108, a pixel electrode 118, and a data link 136, is formed on a lower substrate 142 using a first mask process. The gate pattern has a double layered structure including a transparent first conductive layer 101 and a second conductive layer 103. The first mask process is the same as described in FIGS. 5A and 5B.

Then a gate insulating film 144, a semiconductor pattern 115 including an active layer 114 and an ohmic contact layer 116, and a source/drain pattern including a data line 104, a source electrode 110, a drain electrode 112, and a storage upper electrode 122 are formed using a second mask process as illustrated in FIG. 21B. The second mask process is the same as described in FIGS. 6A and 7E.

Referring to FIG. 21C, a passivation film 146, which covers the source/drain pattern, is formed using a third mask process, such that there is a transmission hole 154 in a transmissive area to expose a first conductive layer of the pixel electrode, a third contact hole in a contact area to expose the side of the data line 104 by penetrating the data line 104 and the semiconductor pattern 115, and a fourth contact hole 164 to expose the first conductive layer 101 of the data link 136.

Figure 21D:
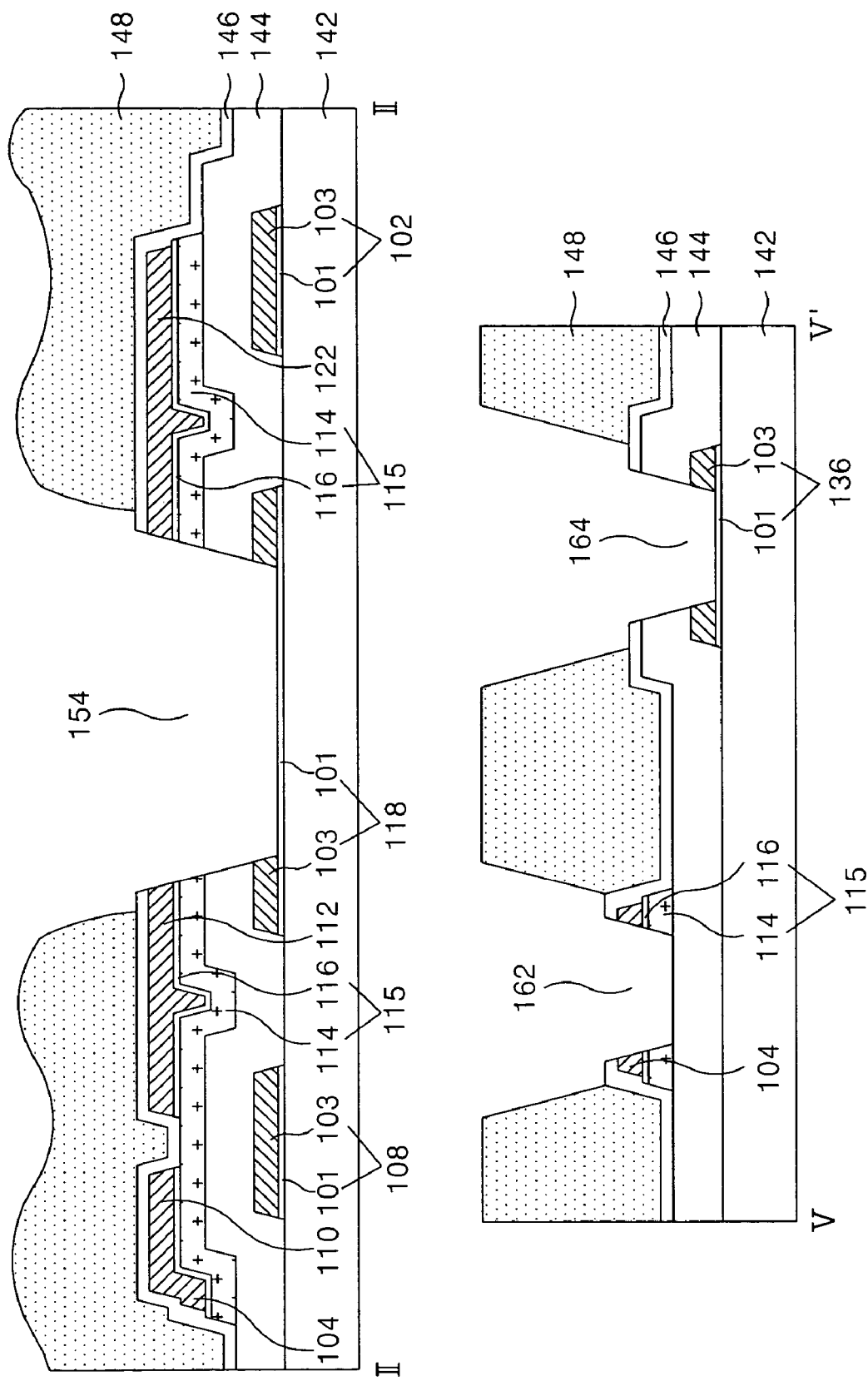

Referring to FIG. 21D, an organic film 148 is formed on the passivation film 146 using a fourth mask process, such that the organic film 148 is removed in the transmission hole 154 and the third and fourth contact holes 162, 164. Furthermore, the organic film 148 is opened in a pad area and it has an embossed surface only in the reflective area where the reflective electrode 152 is to be formed in the following process. The fourth mask process is the same as described in FIGS. 8A and 8B.

Referring to FIG. 21E, the reflective electrode 152 and a contact electrode 160 are formed using a fifth mask process. The fifth mask process is the same as described in FIGS. 10A and 10B.

As described above, the transflective liquid crystal display device and fabricating method thereof according to the present invention connects the pixel electrode with the drain electrode and the storage upper electrode using a reflective electrode that runs through the edge part of a transmission hole. Accordingly, the fabrication process of a thin film transistor substrate can be simplified to a five mask processes thereby reducing one mask process, and no separate contact hole is required to connect the pixel electrode with the drain electrode and the storage upper electrode, thus the aperture ratio of the transmissive area is increased.

Further, the transflective liquid crystal display device and a method of fabricating same according to the present invention connects the data link and the data line, which are formed in different layers, by use of the contact electrode of the same metal as the reflective electrode, and it reciprocally connects the thin film transistors of the electrostatic discharging device. Accordingly, the fabrication process of a thin film transistor substrate can be simplified to five mask processes.

In addition, the transflective liquid crystal display device and fabricating method thereof according to the present invention has the reflective electrode AlNd connected to the first conductive layer ITO through the second conductive layer Mo of the pixel electrode, thus it can reduce the contact resistance of the reflective electrode and the pixel electrode. Further, the reflective electrode is formed in the double structure of AlNd/Mo to enable to further reduce the contact resistance with the first conductive layer ITO of the pixel electrode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    forming a gate pattern including a first transparent conductive layer using a first mask, the gate pattern including a pixel electrode, a gate electrode and a gate line;
    forming a first insulating film on the gate pattern;
    forming a semiconductor layer and a source/drain pattern on the first insulating film using a second mask, the source/drain pattern having a storage upper electrode, a drain electrode, a source electrode, and a data line;
    forming a second insulating film over the source/drain pattern using a third mask;
    forming a transmission hole exposing the first transparent conductive layer of the pixel electrode using a fourth mask; and
    forming a reflective electrode in a reflective area using a fifth mask, wherein the reflective electrode is directly connected with the pixel electrode, the drain electrode and the storage upper electrode within the transmission hole.

2. The method according to claim 1, wherein the semiconductor layer overlaps with the data line.

3. The method according to claim 1, wherein the transmission hole passes through the first insulating film and a second conductive layer of the pixel electrode.

4. The method according to claim 3, further comprising a third insulating film on at least one of the source/drain pattern and the second insulating film.

5. The method according to claim 4, wherein the transmission hole passes through the third insulating film.

6. The method according to claim 1, wherein the transmission hole overlaps with an aperture portion of the second insulating film.

7. The method according to claim 1, wherein the gate pattern is formed of a double layer having a first conductive layer and a second conductive layer.

8. The method according to claim 7, further comprising:
    forming a double layered gate pad using the first mask, the gate pad being connected to the gate line;
    forming a double layered data pad using the first mask, the data pad being connected to the data line;
    removing the second insulating film in a pad region of the gate and data pads using the third mask; and
    forming first and second contact holes exposing a first conductive layer of gate and data pads using the fourth mask.

9. The method according to claim 8, further comprising:
    forming a double layered data link extending from the data pad using the first mask;
    forming second and third aperture portions using the third mask;
    forming third and fourth contact holes exposing the data line and the data link using the fourth mask; and
    forming a first contact electrode to connect the data line and the data link through the third and fourth contact holes using the fifth mask.

10. The method according to claim 9, wherein the second and third aperture portions overlap with the data line and the data link.

11. The method according to claim 9, further comprising:
    forming an electrostatic discharging device having a second thin film transistor connected to one of the data and gate lines, a third thin film transistor connected between a gate electrode and a source electrode of the second thin film transistor in a diode form, and a fourth thin film transistor connected between the gate electrode and the drain electrode of the second thin film transistor in a diode form.

12. The method according to claim 11, wherein the forming the electrostatic discharging device includes:
    forming the gate electrodes of the second to fourth thin film transistors using the first mask;
    forming the semiconductor layers, the source electrodes and the drain electrodes of the second to fourth transistors on the first insulating film using the second mask;
    forming fourth to ninth aperture portions on the second insulating film using the third mask;
    forming fifth to tenth contact holes exposing electrodes overlapping with the fourth to ninth aperture portions using the fourth mask; and
    forming second to fourth contact electrodes using the fifth mask.

13. The method according to claim 12, wherein the fourth and fifth aperture portions overlap a source electrode and a gate electrode of the third thin film transistor.

14. The method according to claim 12, wherein the sixth and seventh aperture portions overlap a drain electrode of the third or fourth thin film transistors and a gate electrode of the second thin film transistor.

15. The method according to claim 12, wherein the eighth and ninth aperture portions overlap a source electrode and a gate electrode of the fourth thin film transistor.

16. The method according to claim 12, wherein the second contact electrode connects to a source electrode and a gate electrode of the third thin film transistor through the fifth and sixth contact holes.

17. The method according to claim 12, wherein the third contact electrode connects to a drain electrode of the third or fourth thin film transistor and the gate electrode of the second thin film transistor through the seventh and eighth contact holes.

18. The method according to claim 12, wherein the fourth contact electrode connects to a source electrode and a gate electrode of the fourth thin film transistor through the ninth and tenth contact holes.

19. The method according to claim 12, wherein the first to fourth contact electrodes are formed inner portion from a sealant area.

20. The method according to claim 12, wherein the reflection electrode and the first to fourth contact electrodes are formed of AlNd and Mo.

21. The method according to claim 1, wherein the second insulating film is an organic material.

22. The method according to claim 1, wherein the second insulating film has an embossed surface.

23. The method according to claim 1, wherein the reflection electrode has an embossed surface.

24. A method of fabricating a liquid crystal display device, comprising:
   forming a gate pattern having a first transparent conductive layer and a second opaque second conductive layer using a first mask, the gate pattern including a pixel electrode, a gate electrode and a gate line;
   forming a first insulating film and a semiconductor layer on the gate pattern, and a source/drain pattern having a storage upper electrode, a drain electrode, a source electrode, a data line using a second mask;
   forming a transmission hole exposing the first conductive layer of the pixel electrode in a transmissive area using a third mask;
   forming a second insulating film over the source/drain pattern using a fourth mask; and
   forming a reflective electrode in a reflective area using a fifth mask, wherein the reflective electrode is directly connected with the pixel electrode, the drain electrode and the storage upper electrode within the transmission hole.

25. The method according to claim 24, wherein the semiconductor layer overlaps with the data line.

26. The method according to claim 24, wherein forming the transmission hole further comprises:
   forming a third insulating film that covers the source/drain pattern.

27. The method according to claim 26, wherein the transmission hole penetrates from the third insulating film to the second conductive layer of the pixel electrode.

28. The method according to claim 24, further comprising:
   forming a double layered gate pad using the first mask, the gate pad being connected to the gate line;
   forming a double layered data pad using the first mask, the data pad being connected to the data line;
   forming first and second contact holes exposing a first conductive layer of gate and data pads using the third mask; and
   removing the second insulating film in a pad area of the gate and the data pads using the fourth mask.

29. The method according to claim 24, further comprising:
   forming a double layered data link using the first mask, the data link extending from the data pad;
   forming third and fourth contact holes exposing the data line and the data link using the third mask;
   extending the third and fourth contact holes to the insulating film using the fourth mask; and
   forming a first contact electrode to connect the data line and the data link through the third and fourth contact holes using the fifth mask.

30. The method according to claim 24, further comprising:
   forming a electrostatic discharging device having a second thin film transistor connected to one of the data and gate lines, a third thin film transistor connected between a gate electrode and a source electrode of the second thin film transistor in a diode form, and a fourth thin film transistor connected between a gate electrode and a drain electrode of the second thin film transistor in a diode form.

31. The method according to claim 30, wherein forming the electrostatic discharging device comprises:
   forming the gate electrodes of the second to fourth thin film transistors using the first mask;
   forming the semiconductor layers, the source electrodes, and the drain electrodes of the second to fourth transistors on the gate insulating film using the second mask;
   forming fifth to tenth contact holes using the third mask;
   extending the fifth to tenth contact holes to the second insulating film using the fourth mask; and
   forming second to fourth contact electrodes that using the fifth mask.

32. The method according to claim 31, wherein the fifth and sixth contact holes expose the gate and source electrodes of the third thin film transistor.

33. The method according to claim 31, wherein the seventh and eighth contact holes expose the drain electrode of the third or fourth thin film transistor and the gate electrode of the second thin film transistor.

34. The method according to claim 31, wherein the ninth and tenth contact holes expose the source and drain electrodes of the fourth thin film transistor.

35. The method according to claim 31, wherein the second contact electrode connects to the gate and source electrodes of the third thin film transistor through the fifth and sixth contact holes.

36. The method according to claim 31, wherein the third contact electrode connects the drain electrode of the third or fourth thin film transistor and the gate electrode of the second thin film transistor through the seventh and eighth contact holes.

37. The method according to claim 31, wherein the fourth contact electrode connects the gate and source electrodes of the fourth thin film transistor through the ninth and tenth contact holes.

38. The method according to claim 31, wherein the first to fourth contact electrodes are formed in a sealant area.

39. The method according to claim 31, wherein the reflection electrode and the first to fourth contact electrodes are formed of AlNd and Mo.

40. The method according to claim 24, wherein the second insulating film is an organic material.

41. The method according to claim 24, wherein the second insulating film has an embossed surface.

42. The method according to claim 24, wherein the reflection electrode has an embossed surface.

43. A method of fabricating a liquid crystal display device, comprising:
   forming a gate line including a first transparent conductive layer;
   forming a gate insulating film on the gate line;
   forming a data line crossing the gate line to define a pixel region;
   forming a thin film transistor connected to the gate line and the data line;
   forming a pixel electrode having a second transparent conductive layer;
   forming a storage capacitor including a storage upper electrode overlapping the gate line;
   forming a transmission hole exposing at least a portion of the second transparent conductive layer of the pixel electrode; and
   forming a reflective electrode so that the reflective electrode is directly connected with the pixel electrode, the thin film transistor and the storage upper electrode within the transmission hole.

* * * * *